(12) United States Patent
Michalica et al.

(10) Patent No.: US 11,780,157 B2
(45) Date of Patent: Oct. 10, 2023

(54) DETECTION OF DEFORMATION OF VATS

(71) Applicant: DENTSPLY SIRONA inc., York, PA (US)

(72) Inventors: Thomas Michalica, Wiener Neudorf (AT); Thomas Hasenzahl, Bensheim (DE); Christian Schmidt, Bensheim (DE); Christian Stahl, Bensheim (DE)

(73) Assignee: DENTSPLY SIRONA INC., York, PA (US)

( * ) Notice: Subject to any disclaimer, the term of this patent is extended or adjusted under 35 U.S.C. 154(b) by 363 days.

(21) Appl. No.: 17/280,292

(22) PCT Filed: Oct. 1, 2019

(86) PCT No.: PCT/EP2019/076609
§ 371 (c)(1),
(2) Date: Mar. 26, 2021

(87) PCT Pub. No.: WO2020/070136
PCT Pub. Date: Apr. 9, 2020

(65) Prior Publication Data
US 2022/0032538 A1    Feb. 3, 2022

(30) Foreign Application Priority Data

Oct. 1, 2018    (AT) .............................. A 50838/2018

(51) Int. Cl.
| | |
|---|---|
| *B29C 64/124* | (2017.01) |
| *B33Y 10/00* | (2015.01) |
| *B33Y 30/00* | (2015.01) |
| *B29C 64/264* | (2017.01) |
| *B29C 64/232* | (2017.01) |
| *B29C 64/245* | (2017.01) |

(Continued)

(52) U.S. Cl.
CPC .......... *B29C 64/124* (2017.08); *B29C 64/232* (2017.08); *B29C 64/245* (2017.08); *B29C 64/255* (2017.08); *B29C 64/264* (2017.08); *B29C 64/295* (2017.08); *B33Y 10/00* (2014.12); *B33Y 30/00* (2014.12); *G01F 22/02* (2013.01)

(58) Field of Classification Search
CPC ... B29C 64/124; B29C 64/264; B29C 64/232; B29C 64/245; B29C 64/255; B29C 64/295; G01F 22/02; B33Y 10/00; B33Y 30/00

See application file for complete search history.

(56) References Cited

U.S. PATENT DOCUMENTS

2018/0194080 A1* 7/2018 El-Siblani .............. B33Y 50/02

* cited by examiner

*Primary Examiner* — Joseph S Del Sole
*Assistant Examiner* — Jamel M Nelson
(74) *Attorney, Agent, or Firm* — DENTSPLY SIRONA INC.

(57) ABSTRACT

Device for a system for layer-by-layer construction of a body (K) from a substance (S) which can be hardened by radiation, comprising a vat having a vat base for receiving the substance (S) which can be hardened by radiation, comprising a building platform which is arranged above the vat base and which is height-adjustable in relation to the vat base and comprising a sensor cooperating with the vat base, wherein the vat base is configured to be at least partially flexible, wherein a chamber is provided wherein the chamber is delimited by an underside of the vat base, wherein the sensor is adapted to detect a volume change of the chamber and to provide a sensor signal from which a sign of the volume change can be determined.

27 Claims, 32 Drawing Sheets

(51) Int. Cl.
  *B29C 64/255*   (2017.01)
  *B29C 64/295*   (2017.01)
  *G01F 22/02*   (2006.01)

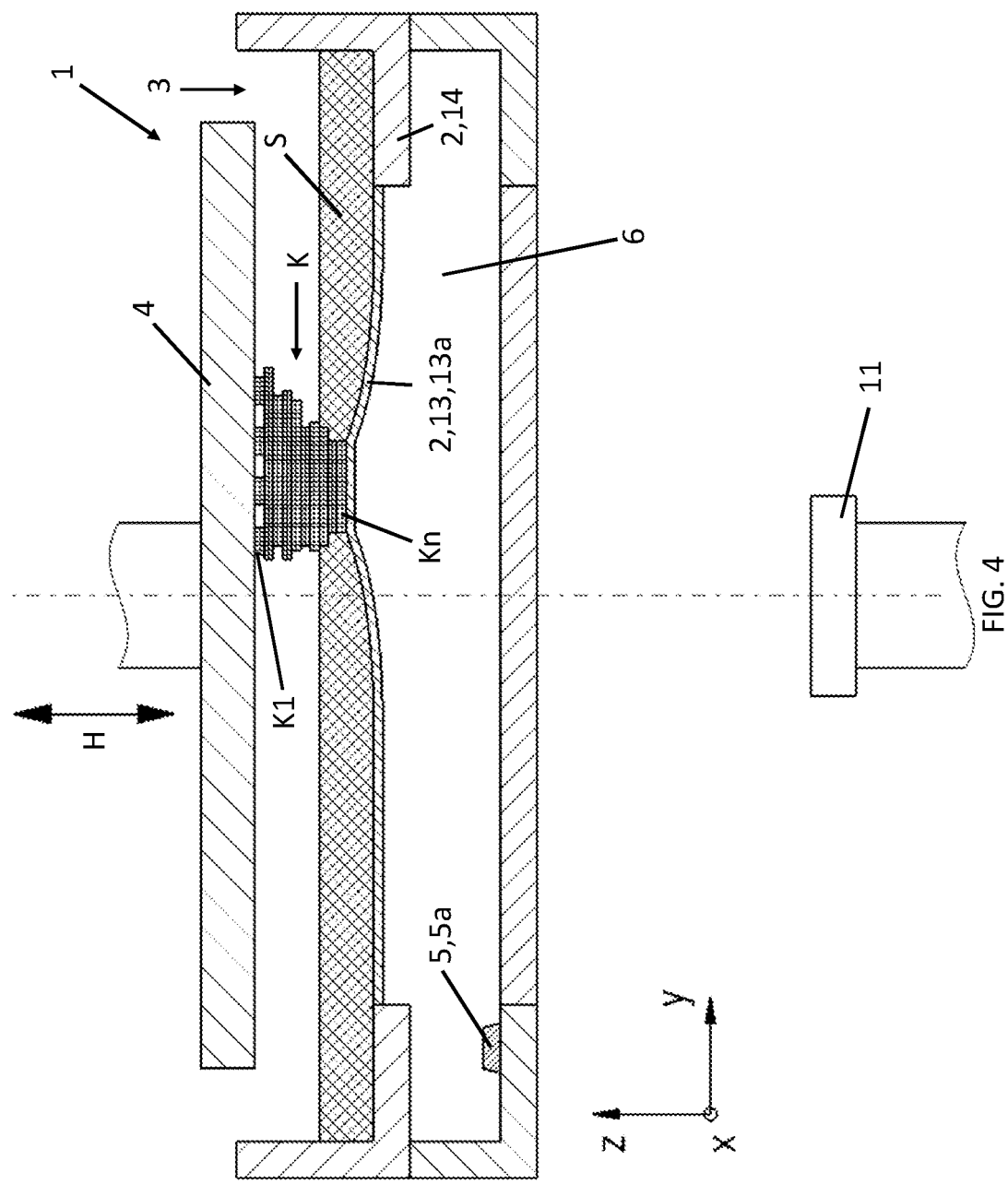

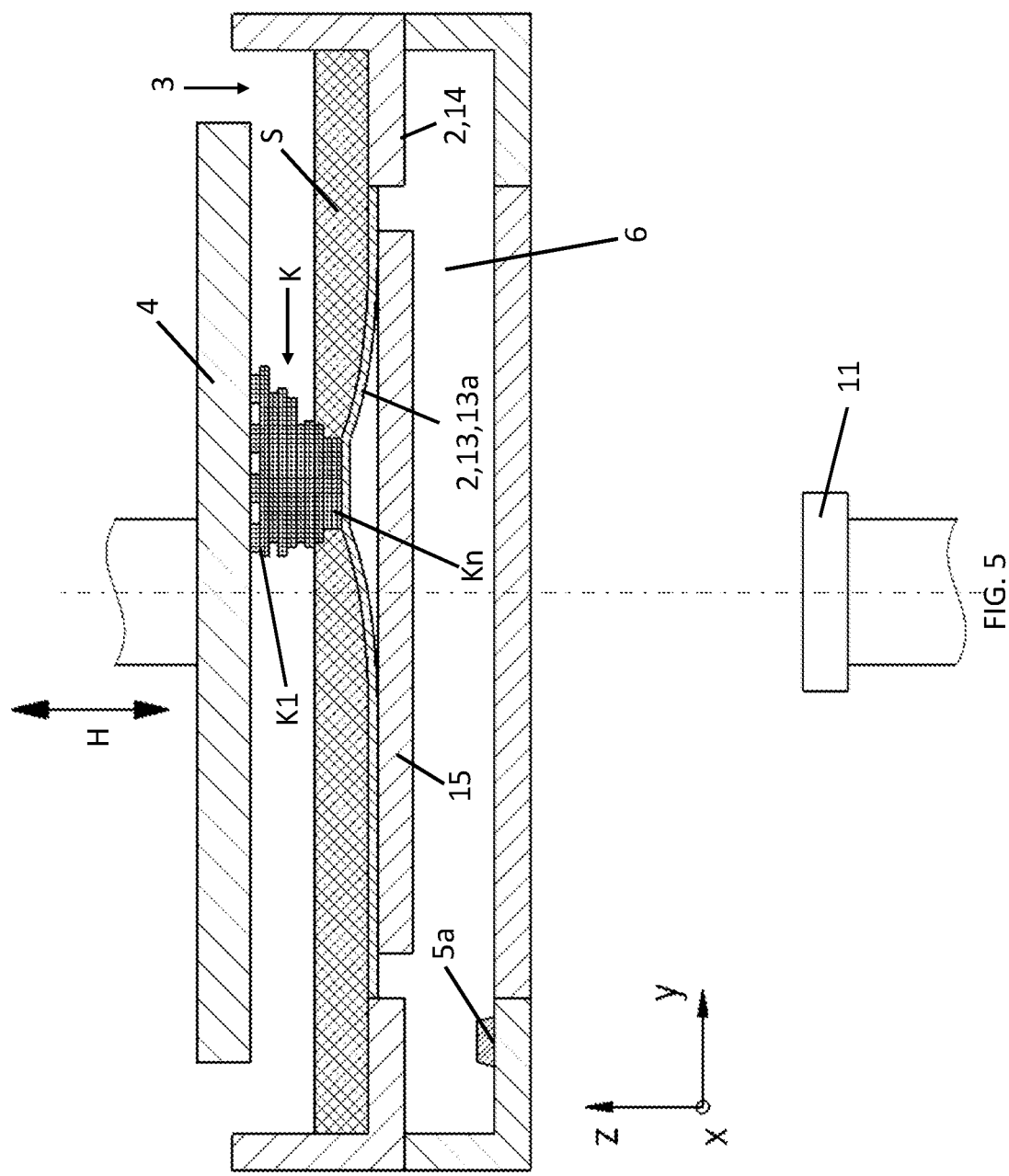

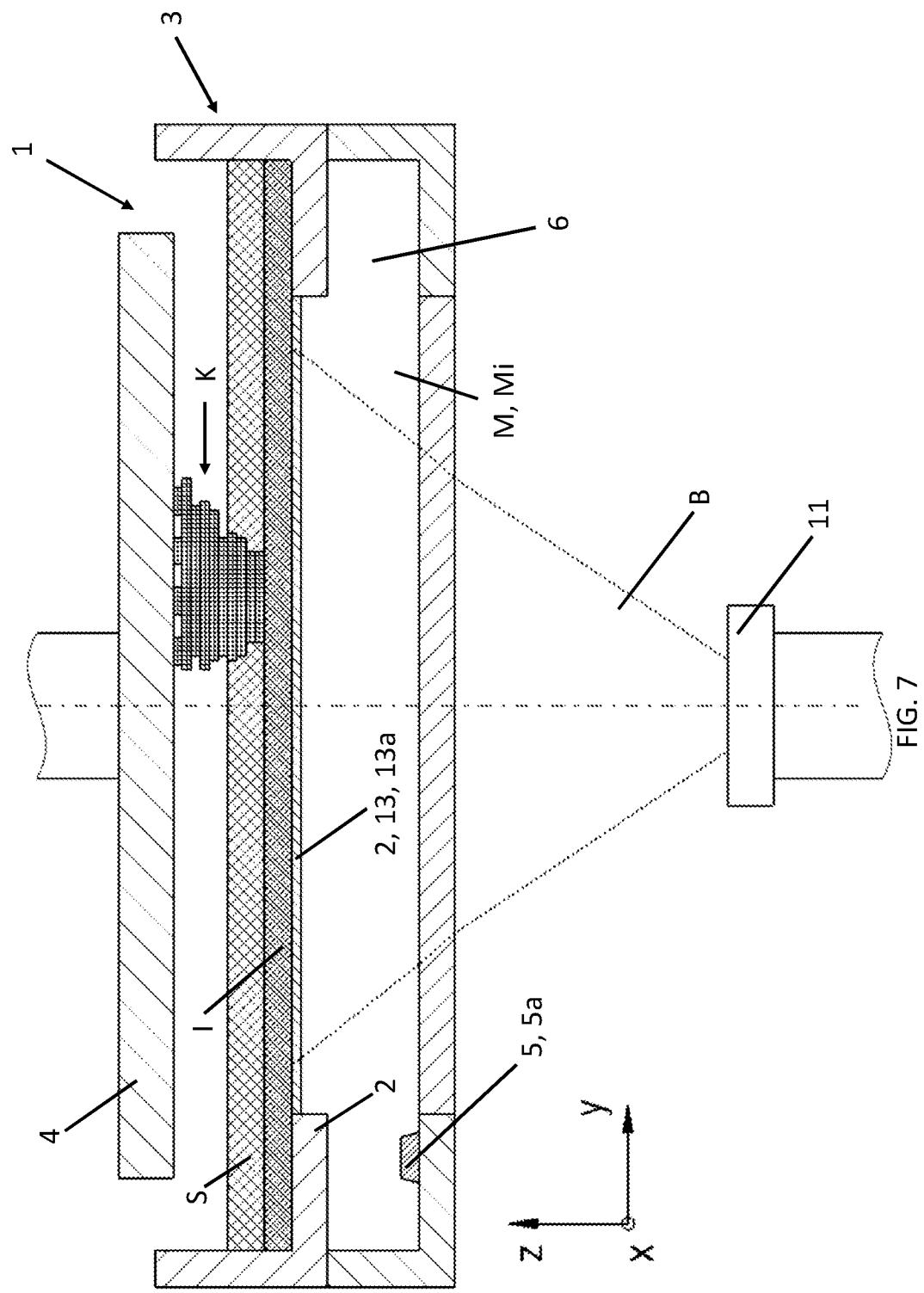

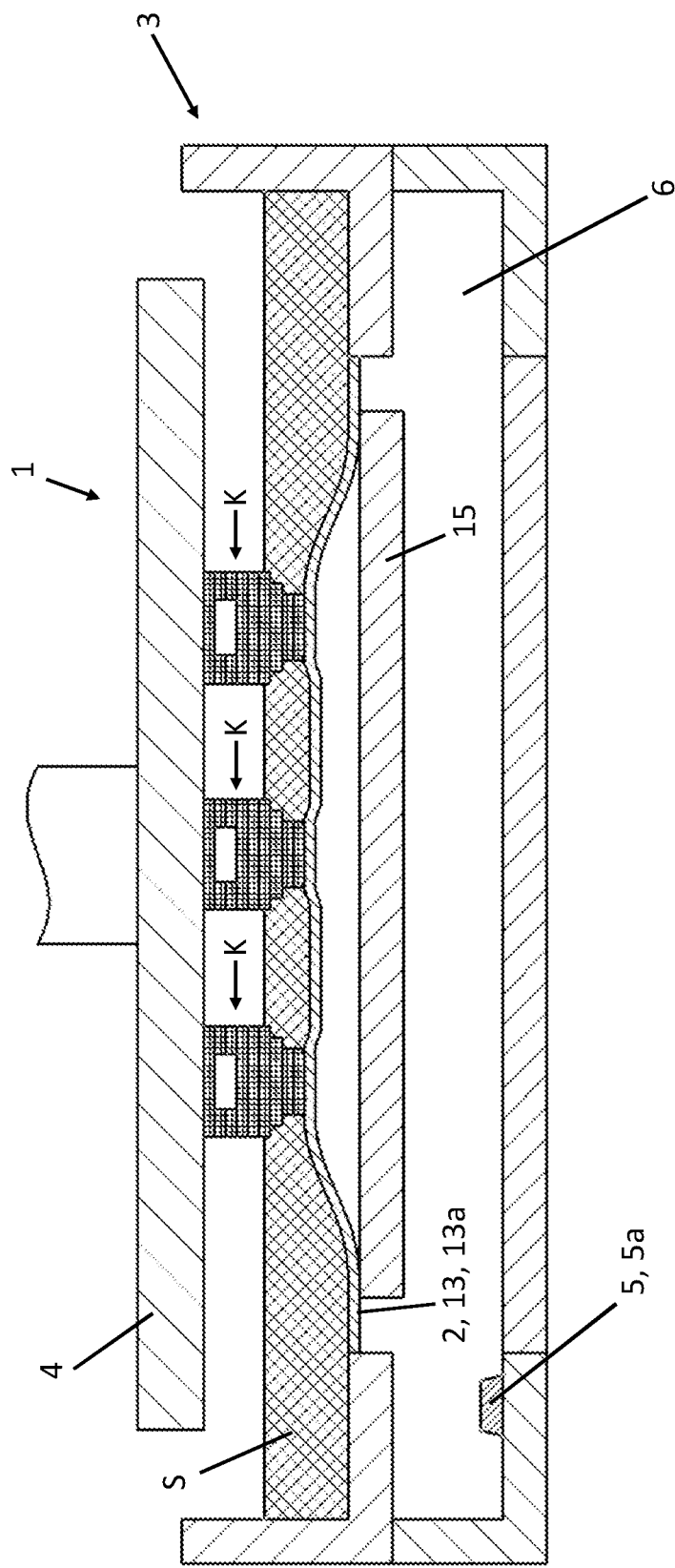

DETECTION OF DEFORMATION OF VATS

CROSS-REFERENCE TO RELATED APPLICATIONS

This is a National Phase application of International Application No. PCT/EP2019/076609, filed Oct. 1, 2019, which claims the benefit of and priority to Austrian Application Ser. No. A 50838/2018, filed on Oct. 1, 2018, which are herein incorporated by reference for all purposes.

TECHNICAL FIELD

The invention relates to a device for a system for layer-by-layer construction of a body from a substance which can be hardened by radiation, comprising a vat having a vat base for receiving the substance which can be hardened by radiation, comprising a building platform which is arranged above the vat base and which is height-adjustable in relation to the vat base and comprising a sensor cooperating with the vat base, wherein the vat base is configured to be at least partially flexible.

The invention relates also to a method for the layer-by-layer construction of a body from a substance which can be hardened by radiation which is received in a vat which comprises a vat base and for each layer of the body to be formed a building platform which is height-adjustable in relation to the vat base is moved into a height above the vat base which height defines a distance between the building platform or the last-formed layer of the body to the vat base in the extent of at least the thickness of the layer to be formed of the body, the substance which can be hardened by radiation is selectively hardened by irradiation by means of a radiation source to form the layer of the body and the height-adjustable building platform with the hardened layer of the body adhering thereto is moved away from a rest position of the vat base to create space for the formation of a next layer between the hardened layer of the body and the vat base, wherein the vat base is configured to be at least partially flexible and at least one process parameter is detected by a sensor cooperating with the vat base.

BACKGROUND OF THE INVENTION

Devices and methods for the layer-by-layer construction of a three-dimensional body from a substance which can be hardened by radiation are also known under the terms 3D printing, additive manufacturing or rapid prototyping. In this case, the cross-sectional information of the substance to be hardened layer-by-layer by electromagnetic radiation, for example, a photoresin, is generally created by a mask projection method or by a laser source. In generative production machines which enable a, for example, continuous printing process, usually pixel-controlled DLP (Digital Light Processing), MEMS (Microelectromechanical Systems), LC (Liquid crystal) displays, LED displays or controllable lasers are used for exposure of the cross-section or of the layers. In this case, a solid layer is generated by exposure from the liquid, photosensitive substance. This layer adheres to a carrier and is released or removed from a reference surface by lifting the carrier. In subsequent production steps the hardened layer released from the reference surface functions as carrier. Thus, a three-dimensional body is successively drawn or formed from the photosensitive substance.

The hardenable substance is generally received in a vat having a radiation-permeable and at least partially flexible vat base. With the flexible vat base the pulling forces produced during the process of separating the hardened layer from the vat base can be minimized in order to avoid excessive pulling forces damaging the body to be generated or separating it from the building platform.

A known problem here is the lack of information when the generated body has been released from the vat base. Accordingly, an empirical value is usually used which can additionally be varied depending on introduced radiation intensity and geometry of the hardened partial layer.

EP 2 173 538 B2 relates to a device for producing a three-dimensional component by solidifying a solidifiable material, comprising a radiation source, a component carrier with a platform carrying the component, a container for receiving the solidifiable material, a flexible film or a foil in the building region of the component, a displacement device for displaying the component carrier, a sensor and a control unit connected to the sensor for controlling the displacement device and the radiation source. The sensor is arranged to scan or measure a pressure or a tension on a flexible film or a flexible foil in the building surface. The sensor allows a real-time observation of process-critical factors. The measured value is output to the control unit in order to adapt the movement or the movement speed of the component carrier by means of the displacement device.

Although the known devices are configured for the detection and control of individual process parameters, there is a need for improved devices, in particular for a more comprehensive detection and control of process parameters.

SUMMARY OF THE INVENTION

It is now the object of the invention to provide a device and a method as specified initially which enables the detection and control of process parameters and therefore rapid production of bodies constructed layer-by-layer in the simplest and most reliable manner possible with the smallest possible amount of waste. In addition, error states in the production process should be reliably detected or avoided.

For this purpose the invention provides a device as defined in claim 1 and a method as defined in claim 15. Advantageous embodiments and further developments are specified in the dependent claims.

According to the invention, it is provided that a chamber is provided wherein the chamber is delimited by an underside of the vat base, wherein the sensor is adapted to detect a volume change of the chamber and to provide a sensor signal from which a sign (or polarity, i.e. positive or negative sign) of the volume change can be determined.

The device, which is at least a part of a system for the layer-by-layer construction of a body from a substance which can be hardened by radiation, comprises a vat having a vat base which is configured to be at least partially flexible for receiving the substance which can be hardened by radiation. For this purpose, the vat is configured to be liquid-tight in an extent which prevents an unintentional outflow of the hardenable substance (of the hardenable material) through the vat. The hardenable substance can, for example, be hardenable by electromagnetic radiation, in particular by light such as visible light or by UV (ultraviolet light). In particular, the hardenable substance can be a resin. In this case, the hardenable substance can have a viscosity, for example, in the range between that of water and that of a pulpy or pasty substance. A building platform is arranged above the vat base which building platform is adapted to be height-adjustable in relation to the vat base. The building platform which is expediently configured as a flat plate serves as a platform on which the body is constructed in a layer-by-layer manner by irradiation of certain areas of individual layers of the hardenable substance. The distance between the building platform and the vat base is adjusted with the height adjustment of the building platform, i.e. the height of the building platform is defined as the distance to the (loaded or unloaded, substantially horizontal) vat base. The device additionally comprises a sensor cooperating with the vat base in order to be able to thereby detect deflections of the flexible vat base from a loaded or unloaded rest position. For this purpose, a chamber is provided which is delimited by an underside of the vat base. Thus, the vat base is a part of a chamber housing of the chamber which is provided underneath the vat (i.e. on a side of the vat base opposite the hardenable substance during operation) and in which chamber a compressible or substantially incompressible medium is accommodated. Accordingly, a part of the chamber, for example, a wall of the chamber is formed by the vat base. The chamber is therefore substantially a closed or partially closed container whose interior is delimited in sections by the vat base. The sensor cooperating with the vat base can be accommodated in the chamber or in the cavity of a body connected to the chamber, for example, in the cavity of a hose connected to the chamber and cooperating with the interior of the chamber. Such a body connected to the chamber can in particular be understood as part of the chamber.

The sensor is adapted to detect a volume change of the chamber and to provide a sensor signal from which a sign of the volume change can be determined. The sensor is thus configured in particular at least for detecting whether the volume of the chamber is increased or decreased and is configured to output, depending on this, a sensor signal having at least two different signal values or signal forms, one signal value/signal form in the case of an increase in the volume of the chamber and a different signal value/signal form in the case of a decrease in the volume of the chamber. The different signal values/signal forms can then be assigned a positive or a negative sign of the volume change of the chamber. In this case, the volume changes are dependent on the position or the deflection of the vat base. The sensor can also be configured to detect a volume of the chamber which remains the same in order to output in this case a sensor signal having a third signal value or a third signal form. The sign of the volume change need not be determinable from a single signal value of the sensor signal. For example, the sensor signal can also enable a determination of the sign of the volume change by means of at least two signal values of the sensor signal detected at different times.

The aforesaid sensor signal can fundamentally also be provided by a sensor which can determine the absolute volume of the chamber. That is, such sensors are objectively also included. On the one hand a volume change can be determined from the absolute value of the volume by repeated measurement and a corresponding sensor signal can be provided (even if the determination is not actually carried out, the volume change could be determined however); on the other hand, a single absolute value can be compared, for example, with a predefined reference value or with a threshold value in order to provide a signal from which a volume change or at least the sign thereof can be determined (e.g. change above/below reference value or above/below threshold value).

The invention is not restricted to sensor signals from which the sign of a volume change can be exclusively determined. Likewise, the invention is not restricted to sensor signals which comprise the sign of a volume change.

On the contrary, for example, sensor signals are also included which also (i.e. additionally to the sign) or even exclusively specify or comprise an absolute value of a volume change because a corresponding sign can usually already be determined from the absolute value. Thus, possibly in the event of a rate of change above a predefined threshold value, it can be assumed that this comprises a reduction in the volume after release of the last-produced layer of the body from the vat base. The predefined threshold value can in this case be determined at least approximately from the movement speed of the building platform and the area of the last-produced layer because these parameters specify the absolute value of the predicted maximum rate of increase in the volume (i.e. the maximum positive volume change).

Furthermore, the invention is not restricted to a single sensor. For example, a plurality of sensors of the same type or of different types can be provided, which are adapted to detect a volume change of the chamber and to provide a sensor signal from which a sign of the volume change can be determined. In this case, it is not necessary that the volume change or the sign thereof is determined on the basis of the sensor signal of each individual sensor independently of the other sensors and the sensor signals thereof. On the contrary, it is sufficient if the sensor signals of the individual sensors are taken into account when determining the volume change or the sign thereof in addition to other parameters and sensor signals; i.e. a determinability in the sense of the present disclosure is already provided for the individual sensor signals when the volume change or also only the sign thereof is ultimately determined from several sensor signals.

Since the sensor is provided for detecting a volume change of the chamber and therefore for detecting the process-dependent position change of the vat base, a plurality of process parameters which are related to the position change of the vat base can be determined with the device. In particular, also only partial, i.e. local position changes of the vat base can be detected with the sensor. If accordingly, reference is made to a position of the vat base, a uniform or flat arrangement of the vat base should not necessarily be understood by this. On the contrary, the position, the location or the deflection of the vat base is also defined for a curved vat base or a vat base deflected differently over its surface extension.

When reference is made in the description to the terms height, horizontal, vertical, top, bottom, above or below, these terms or other positional or directional information should be understood in the usage position of the device.

According to a preferred embodiment of the device, the sensor is adapted to quantitatively detect a measured variable directly or indirectly proportional to the volume of the chamber or to the volume change and to provide the measured variable as a sensor signal. Thus, the volume or the volume change of the chamber is detected by detecting the measured variable directly or indirectly proportional thereto. The sensor is configured to detect this measured variable and to output a sensor signal representing the value of the measured variable.

It is particularly favourable if the sensor is a pressure sensor adapted to detect a pressure and/or a pressure change of a compressible medium received in the chamber, which pressure change corresponds to the volume change, and/or is a flow sensor adapted and arranged to detect a change in an amount of substance of the amount of substance enclosed in the chamber of a fluid received in the chamber (i.e. a gas or a liquid), which change in an amount of substance corresponds to the volume change, wherein the sensor is adapted to provide a detected pressure and/or a detected pressure change and/or a detected change in the amount of substance as a measured variable and sensor signal. The pressure, the pressure change and the change in the amount of substance in the chamber are measured variables directly or indirectly proportional to the volume of the chamber or to the volume change. If the sensor is a pressure sensor, a pressure and/or a pressure change in the chamber, in particular of a compressible medium received in the chamber can be detected therewith. As a pressure sensor, the sensor therefore detects a volume change of the chamber by means of the pressure or a pressure change in the chamber. In this case, the pressure, the pressure changes, the volume and the volume changes are dependent on the position or on the deflection of the vat base. In order to ensure a reliable pressure detection by the sensor, in this case at least during the deflection of the vat base from a rest position and measurement of the pressure or the pressure change, the chamber is configured to be closed and substantially tight for the compressible medium. The closed chamber need not be configured to be completely tight, i.e. it can have slight leaks as long as the function of the device, in particular a largely correct pressure detection for the manufacturing process of at least one body to be produced is ensured. That is, the pressure chamber can be designed so that a slow/sluggish pressure equalization with the surroundings can take place, when process-dependent pressure gradients can nevertheless be detected. The sensor can also be a flow sensor which is adapted and arranged to detect a change in the amount of substance, the change corresponding to the volume change, of the amount of substance enclosed in the chamber of a fluid received in the chamber. In this case, the sensor configured as a flow sensor detects a volume change of the chamber by means of the change in the amount of substance of the fluid in the chamber. In this case, the change in the amount of substance, the volume and the volume changes are dependent on the position or on the deflection of the vat base. For this purpose, the chamber comprises at least one opening acting as an inlet and/or outlet for the fluid, i.e. an exchange of fluid can take place between the interior of the chamber and the external surroundings of the chamber or a fluid reservoir provided for this purpose. The flow sensor is arranged in or at least near the opening in order to be able to detect the fluid flow through the opening, into the chamber or out of the chamber. In the case of a plurality of openings, a plurality of flow sensors can be provided which are each assigned to an opening so that preferably each opening is assigned a flow sensor. A volume change can then be determined from a balance of all the detected changes in the amount of substance. High precision requirements are not necessarily imposed on the detection of the fluid flow. It can be sufficient to detect the instantaneous direction of the fluid flow, i.e. whether this is directed into the chamber in the case of an increase in the volume or out of the chamber in the case of a reduction in the volume. The flow sensor can, however, also be configured for an output of the detected fluid flow with higher accuracy. A detection of volume changes by means of a change in the amount of substance of the fluid enclosed in the chamber has the advantage compared with a pressure detection that on account of the opening in the chamber, a pressure equalization between the interior and the exterior of the chamber can take place automatically and a deformation of the vat base as a result of variation of the external air pressure (weather, installation site of the device) can be avoided. In addition, the requirements on the tightness of the chamber are lower and therefore the error proneness of the vat is reduced. The pressure sensor is adapted to provide the detected pressure or the detected pressure change or at least the detected sign of the pressure change as a sensor signal or output signal. Accordingly, the flow sensor is adapted to provide the detected change in the amount of substance or at least the detected sign of the change in the amount of substance as a sensor signal or output signal. Within the scope of the present invention, a plurality of different sensors can also be used in parallel to combine the advantages of the different measurement methods and to achieve a higher flexibility with regard to the use of the chamber. For example, a pressure sensor can be used together with a plurality of flow sensors.

According to a preferred embodiment of the device, the sensor can be connected to a processing unit which is adapted to process the sensor signal provided by the sensor. For this purpose the processing unit can comprise a microprocessor or a microcontroller. In addition, the processing unit can be connected to a data memory which contains data and/or program commands for the processing of a volume change detected by the sensor or a measured variable proportional to this. For the operation of the processing unit by an operator, the processing unit can be connected to an input/output device, for example, a touchscreen. As a result of the provision of the processing unit, actions required for the production of the 3D body can be executed automatically. On the other hand, without the processing unit these actions would have to be performed manually by an operator for which the sensor would at least be connected to a display unit for displaying the detected volume change or a measured variable proportional thereto or a sign of the volume change determined from one or more measured variables.

In order to be able to control the device expediently, it is advantageous if the sensor is connected via the processing unit to a drive unit for the height-adjustable building platform and/or to a control unit for a radiation source which is provided for the irradiation of the substance which can be hardened by radiation, and the processing unit is adapted to control the drive unit for the height-adjustable building platform and/or the control unit for the radiation source depending on the sensor signal provided by the sensor. Thus, values of the pressure, the pressure change or the change in the amount of substance, detected by the sensor, and/or a determined sign of a volume change can be transmitted by the sensor, preferably in real time to the processing unit and processed in this unit. If the processing unit is connected to the drive unit for the height-adjustable building platform and is configured to control the drive unit, the height adjustment of the building platform can be accomplished by the processing unit depending on the detected pressure, the pressure change or the change in the amount of substance or a determined sign of a volume change in the chamber. The drive unit makes it possible to move the building platform and therefore the body to be produced at least towards the vat base and away from this. Preferably the drive unit is configured to bring the building platform or the lowest, i.e. last-produced layer of the body as far as the vat base. The drive unit can comprise an electric motor, for example, a step motor, which is connected to the building platform. In particular, the electric motor can be in engagement with a height-adjustable rod, wherein the rod is connected to the building platform. If the processing unit is connected to the control unit for a radiation source and is configured to control the control unit, the irradiation of the substance which can be hardened by radiation can be accomplished by the processing unit depending on the detected pressure, the pressure change or the change in the amount of substance or a determined sign of a volume change in the chamber.

Preferably the control unit for the radiation source and therefore also the processing unit is configured to control the radiation intensity and/or the irradiation time (duration). The radiation source can be a light source, in particular a source for visible light or UV light. The radiation intensity and/or the irradiation time generally have an influence on the adhesive force of the hardened layer produced with this radiation intensity and/or irradiation time on the previously hardened layer or on the building platform.

It is furthermore favourable if the chamber is connected to at least one adjustable pressure source for setting a resting pressure in the chamber and/or an adjustable heating device for setting a temperature in the chamber and/or an adjustable process substance source for the adjustable supply of a process medium for the at least local manipulation of the solidification process of the substance which can be hardened by radiation into the chamber and/or an air flow source for producing an air flow in the chamber. The rest position of the vat base can be set by setting the resting pressure in the chamber. The resting pressure can, however, also be changed during the process of producing the body, for example, to promote a release of the last-produced layer of the body from the vat base by application of a negative pressure or excess pressure in the chamber. An excess pressure in the chamber would, for example, promote the release if the excess pressure is applied intermittently with or without combining with a Z movement (i.e. raising or lowering the carrier). In the case of an unsupported tensioned foil, an excess pressure would also increase the tension of the foil and therefore additionally tension and therefore stiffen the vat base formed by the foil. When using a semi-permeable foil, the excess pressure can be used particularly advantageously since, when using an inhibitor such as oxygen, for example, it prevents any adhesion or enables or at least influences the formation of an inert intermediate layer for the next layer cycle. The excess pressure thereby promotes the diffusion of the inhibitor through the semi-permeable foil. An adjustment of the temperature in the chamber can change the viscosity or other process-relevant properties of the hardenable substance received in the vat. An adjustable supply of a process medium into the chamber can at least locally influence the solidification process of the substance which can be hardened by radiation. The process medium can be an inhibitor medium in order to thereby influence, in particular, to slow the solidification process of the substance which can be hardened by radiation, in particular on the vat base; and change the adhesive force of the last-hardened layer on the vat base. An inhibitor medium is understood as a fluid, i.e. a gas or a liquid, for example, oxygen, which reduces or prevents the hardening of the hardenable substance in a boundary layer (e.g. 10-100 μm) above the vat base. Thus, the inhibitor medium reduces (in the ideal case, prevents) adhesion of the last-hardened layer on the vat base. By producing an air flow in the chamber, the properties of the medium received in the chamber, such as, for example, the inhibitor medium or mixture of media in the chamber can be homogenized. In particular, the temperature of the medium in the chamber and the concentration of the inhibitor medium in the chamber can be homogenized. Furthermore, the diffusion speed of the inhibitor medium and the temperature can be influenced. The air flow source can be a fan or a compressor for adjusting a volume flow. The volume flow can be produced in the chamber in a closed circuit or in exchange with ambient air.

In order to be able to control the device expediently, it is furthermore advantageous if the sensor is connected via the processing unit to the adjustable pressure source and/or the adjustable heating device and/or the adjustable process substance source and/or the air flow source, and the processing unit is adapted to control the pressure source and/or the heating device and/or the process substance source and/or the air flow source depending on the sensor signal provided by the sensor. In this case, the sensor detects the current position or movement of the vat base, at least in the form of a current movement direction of the vat base (corresponding to the sign of a volume change). If the sensor is connected via the processing unit to the adjustable pressure source, the pressure source can be controlled by the processing unit to change the position of the vat base by increasing the pressure or reducing the pressure depending on the current position or movement of the vat base. If the sensor is connected via the processing unit to the adjustable heating device, the heating device can be controlled by the processing unit to change the temperature of the medium in the chamber depending on the current position or movement of the vat base. If the sensor is connected via the processing unit to the adjustable process substance source, the process substance source can be controlled by the processing unit to vary the amount of process medium to be introduced into the chamber, for example, even to introduce no process medium into the chamber depending on the current position or movement of the vat base. If the sensor is connected via the processing unit to the air flow source, the air flow source can be controlled by the processing unit to mix the medium in the chamber by means of an air flow produced by the air flow source depending on the current position or movement of the vat base.

For a cost-effective production of the vat base and in order to be able to detect deflections of the vat base reliably and as precisely as possible using the sensor, it is favourable if the vat base is at least partially permeable to radiation and preferably comprises a flexible tensioned foil. As a result, the radiation for the hardening of the hardenable substance received in the vat can penetrate through the at least partially radiation-permeable vat base to the hardenable substance. If the radiation source is arranged underneath the chamber, the chamber, in particular the chamber base, is expediently configured to be at least partially permeable to radiation. If the vat base comprises a flexible tensioned foil, the foil is configured to be sufficiently tight to prevent an undesired penetration of the hardenable substance through the vat base. The foil is preferably configured to be sufficiently tightly tensioned to avoid an appreciable sagging of the foil which is loaded by the hardenable substance, i.e. to be able to form substantially flat layers of the body. The foil is additionally preferably configured to be sufficiently elastic in the tensioned state in order to allow deflections in the direction of the chamber base or away from the chamber base, i.e. downwards or upwards. The vat base can, for example, comprise silicone layers, PTFE foils or Teflon foils and combinations thereof. The elastic behaviour of the vat base is used to minimize the pulling forces produced during the separation process of the last-produced layer from the vat base which pulling forces could otherwise result in damage to the body to be generated or separate this from the building platform.

If the vat base is configured to be semi-permeable, permeable for a process medium, a process medium received in the chamber can penetrate through the vat base and for example, as inhibitor medium reduce or ideally prevent any adhesion of the last-produced, i.e. hardened layer on the vat base. In this way, the release process of the last-produced layer from the vat base can be accelerated or be omitted completely. For example, the vat base can be permeable for oxygen as inhibitor medium. In this case, the vat base is impermeable for the substance which can be hardened by radiation. For example, distilled water can be used as further process medium. In this case, the water can be brought to a specific temperature, for example, 5° C. In this case, the substance to be hardened is cooled by the water at the interface to the vat base and thus the reactivity is reduced in a certain range. This can result in the formation of a likewise unreactive boundary layer and thus in a reduction in the adhesion. By using a highly viscous fluid as process medium such as, for example, silicone oil or special fluoro-oils, the foil can be supported by the fluid in the exposure region and at the same time the pressure difference due to the fluid can be relayed, for example, to a pressure sensor.

In order to relieve the load on the vat base, it can be provided that at least a part of the vat base rests on a carrier plate which is at least partially permeable to radiation, in particular transparent. As a result of the vat base resting at least partially on the carrier plate, an in particular ageing-dependent increasing sagging of the vat base loaded by the hardenable substance can be prevented. The carrier plate thus serves as a support for the vat base. In order to be able to harden the hardenable substance by a radiation source arranged underneath the carrier plate, the carrier plate is expediently configured to be at least partially permeable to radiation, in particular transparent. For example, the carrier plate can be formed at least partially from glass.

In order to be able to reduce or vary in another manner the reactivity of the hardenable substance when a carrier plate is provided, it can further be provided that the carrier plate is configured to be permeable for a process medium or comprises elevations resting on the vat base for the passage of a process medium between the elevations. The process medium can in particular be an inhibitor medium in order to reduce or prevent any adhesion of the last-produced, i.e. hardened layer on the vat base. Thus, if the carrier plate is permeable for the process medium/inhibitor medium, the process medium/inhibitor medium can penetrate from the chamber through the carrier plate and expediently through the vat base to the hardenable substance. For example, the carrier plate can comprise nanoporous glass or aerogel. Generally the carrier plate can comprise structurings on the side facing the vat base additionally or instead of the elevations which structurings thus rest on the vat base in the usage state of the device and which, for example, can also be achieved by a sufficiently rough or corrugated surface of the carrier plate. The elevations and/or structurings are provided so that the process medium/inhibitor medium can flow between the carrier plate and the vat base.

If a doctor blade which is movable in the vat on the vat base is provided, the doctor blade can be guided in the hardenable substance over the vat base. In this case, the doctor blade can remove partially hardened particles of the hardenable substance and ensure a thorough blending of the hardenable substance. In the case of hardenable substances which have a high viscosity as a result of particles contained therein, the doctor blade can be used for smoothing down the layer to be hardened.

It is furthermore favourable if the sensor is connected to a drive unit of the doctor blade via the processing unit and the processing unit is adapted to control the drive unit of the doctor blade depending on the sensor signal provided by the sensor. Optionally, the contact pressure of the doctor blade on the vat base which contact pressure is essential for the function of the doctor blade can be detected by means of the volume change in the chamber using the sensor. If the contact pressure of the doctor blade on the vat base is too high or too low, the contact pressure can be changed via the drive unit of the doctor blade controlled by the processing unit.

According to a further embodiment of the device, it can be provided that the vat base is an openable, in particular removable cover (lid) of a chamber housing of the chamber. As a result of the formation of the vat base as a cover, an openable access into the chamber can be provided. If the vat base is configured to be removable as a cover of the chamber housing, the chamber can be closed by placing the vat on the remainder of the chamber housing. In this case, the vat base as cover of the chamber housing can also comprise at least a part of the side walls of the chamber housing. Alternatively the vat base and the chamber can be formed in one piece.

With regard to the method, it is additionally provided according to the invention that the sensor detects a volume change of a chamber and provides a sensor signal from which a sign (or polarity, i.e. positive or negative sign) of the volume change can be determined, wherein the chamber is delimited by an underside of the vat base, wherein the volume of the chamber can be varied by process-dependent deflections of the vat base from the rest position. The chamber can be at least partially closed. In some exemplary embodiments, the chamber is substantially tightly closed.

In order to avoid repetitions from the part of the description relating to the device, with regard to the description of the method reference is also made to the preceding description of the device insofar as this is applicable to the method.

The method is used for a layer-by-layer construction of a body from a substance which can be hardened by radiation, for example resin which can be hardened by light, which is received in a vat. The vat is impermeable for the hardenable substance and comprises a vat base. For each layer of the body which layer is to be formed, i.e. to be hardened, a height-adjustable building platform is moved in relation to the vat base into a height above the vat base which height defines a distance between the building platform or the last-formed layer of the body to the vat base in the extent of at least the thickness of the layer of the body which layer is to be formed. The last-formed layer of the body, insofar as such a layer has already been formed, thereby adheres with the previously formed layers of the body to the building platform. The substance which can be hardened by radiation between the building platform or the last-formed layer of the body and the vat base is selectively hardened by irradiation by means of a radiation source to form the next layer of the body. The radiation source can be a light source. The height-adjustable building platform with the last-formed or hardened layer of the body adhering thereto is then moved away from a rest position of the vat base to create space for the formation of a next layer between the last-hardened layer of the body and the vat base. An at least partially flexible vat base is provided as vat base and at least one process parameter is detected by a sensor cooperating with the vat base. The sensor detects a volume change of an at least partially closed chamber and provides a sensor signal from which a sign of the volume change can be determined or is determined. In this way, it can be determined whether and when the volume of the chamber is increased or reduced during the production process of the body to be constructed. For this purpose, the chamber is delimited by an underside of the vat base. As a result of process-dependent deflections of the vat base from the rest position, the volume of the chamber is variable/is varied. The volume of the chamber thus varies when the flexible vat base is deflected from its rest position in the course of the process. The definition of the rest position depends on the implementation of the process. The rest position can be defined as that position of the vat base in which the hardenable substance is received in the vat and loads the vat base. The rest position can, however, also be defined as that position of the vat base in which no hardenable substance is received in the vat.

According to a preferred embodiment of the method, it can be provided that the sensor quantitatively detects a measured variable directly or indirectly proportional to the volume of the chamber or to the volume change and provides the measured variable as a sensor signal. Thus, the volume or the volume change of the chamber is determined by detecting the measured variable directly or indirectly proportional to this. The sensor is configured to detect this measured variable and to output a sensor signal representing the value of the measured variable.

It is particularly favourable if the sensor is a pressure sensor or a flow sensor, wherein a change in the pressure of a compressible medium in the chamber, which change corresponds to the volume change, is detected with the pressure sensor as a measured variable or a change in the amount of substance of the amount of substance of a fluid enclosed in the chamber, which change in the amount of substance corresponds to the volume change, is detected with the flow sensor as a measured variable. Thus, the pressure, the pressure change or the change in the amount of substance in the chamber can be understood as a measured variable directly or indirectly proportional to the volume of the chamber or to the volume change of the chamber. In particular, the volume and the volume changes of the chamber and in the case of the pressure sensor, the pressure and the pressure changes in the chamber and in the case of the flow sensor, the changes in the amount of substance in the chamber are dependent on the position or on the deflection of the vat base. If the sensor is a pressure sensor, a pressure or a pressure change in the chamber, in particular of a compressible medium received in the chamber can be detected therewith in order to determine the volume or a volume change of the chamber. For this purpose the chamber is closed and configured to be substantially tight for the compressible medium. With regard to the tightness of the chamber, reference is made to the preceding description of the device. The pressure sensor provides the detected pressure or the detected pressure change as a sensor signal or output signal. The pressure sensor can preferably detect a reference value for the pressure in the chamber which reference value is assigned to a rest position of the vat base. The reference value exists, for example, as long as the release process of a hardened layer from the vat base has not yet begun. The pressure sensor can preferably detect deviations from the reference value which deviations are assigned to deflections from the rest position of the vat base. If the sensor is a flow sensor, a change in the amount of substance in the chamber, in particular of an amount of substance enclosed in the chamber of a fluid received in the chamber can be detected therewith in order to determine a volume change of the chamber. With regard to the configuration of the chamber with at least one opening acting as an inlet and/or outlet for the fluid and the arrangement of the flow sensor in/on the chamber, reference is also made to the preceding description of the device. The direction of the fluid flow and/or measured values of the fluid flow can be detected with the flow meter and provided as sensor signal or output signal.

In order to be able to simplify the actions required to produce the 3D body for an operator, it can be provided that the sensor signal provided by the sensor is processed in a processing unit connected to the sensor and at least one process parameter is set depending on the sensor signal provided by the sensor. In this case, the at least one process parameter to be set can be determined in the processing unit from the sensor signal provided by the sensor, for example, by a comparison with predefined values or by calculation. The processing unit can comprise a microprocessor or a microcontroller for this purpose and be connected to a data memory. The data memory can contain data and/or program commands for the processing of the sensor signal provided by the sensor.

Particularly expediently it can be provided that the processing unit compares the detected measured variable provided as the sensor signal with a predicted value and/or compares the behaviour (course) of detected measured variables (or generally a plurality of measured variables detected at several time points) with a behaviour (course) of predicted values (or generally several predicted values) and sets the at least one process parameter depending on the difference between the measured variable and the predicted value and/or between the behaviour (course) of the measured variables (the plurality of measured variables) and the behaviour (course) of the predicted values (the plurality of predicted values). Furthermore, it can be provided that the processing unit compares a variation between a plurality of measured variables detected at different time points with a predicted value of the variation and sets the at least one process parameter depending on the difference between the variation and the predicted value of the variation. Likewise, the measured variable can also correspond to a rate of change (i.e. change per time unit) and be compared with a predicted value for the rate of change. The predicted value or the predicted values is/are deposited in the processing unit. In particular, the processing unit can compare a behaviour (course) of a plurality of measured variables or measured values detected at several time points and provided as sensor signal with a behaviour (course) of predicted values and set the at least one process parameter depending on the difference between the behaviour (course) of the measured variables or measured values and the behaviour (course) of predicted values. When a measured variable or measured value is compared with a predicted value, the setting of the at least one process parameter can be accomplished depending on whether the measured value exceeds the predicted value or falls below it. The setting of the at least one process parameter can also be accomplished depending on the extent by which the predicted value is exceeded or fallen below. If a plurality of measured variables are compared with a plurality of predicted values, the setting of the at least one process parameter can be accomplished depending on a relative variation of the measured variables compared to the relative variation of the predicted values, i.e. independently of absolute measured values.

It can also be provided that changes in the measured variable detected by the sensor and provided as the sensor signal are processed in a processing unit connected to the sensor in a simulation model of the predicted values of the construction process and at least one process parameter is set depending on at least one detected measured value of the measured variable and/or the change in detected measured values as specified by the simulation model. In this case, the processing unit comprises a simulation model of the predicted values of the construction process. The simulation model calculates at least one value of at least one process parameter depending on the current state in the simulation and depending on input parameters such as at least one value of the measured variable detected by the sensor and provided as sensor signal. Depending on the simulation result, the construction process can be influenced by setting at least one process parameter.

In order to be able to further improve the construction process, it is favourable if the predicted value and/or the plurality of predicted values is or are calculated depending on at least one process parameter by the processing unit. In this way, the predicted values are adapted to the current situation of the construction process and the process can be controlled particularly precisely. The at least one process parameter is favourably the measured variable detected by the sensor and provided as sensor signal.

If the processing unit comprises a simulation model, it is favourable if the simulation model takes into account at least one set process parameter as input value. In this way, the simulation model delivers particularly precise results since previously set process parameters or values thereof are taken into account as input value in the simulation.

The input value can be specified by the user; thus, this can, for example, be the layer thickness, the printing speed, the material used (mechanical properties) etc. as well as combinations of input values. The relevant values can be determined by the user, for example, with the aid of a CAM software (computer-aided manufacturing), which predefines desired values for the process parameters (sequence control). The simulation model can adapt the input values if the signal from the sensor provides this.

It can further be provided that on the basis of the sensor signal provided by the sensor the height of the building platform and/or of the last-hardened layer of the body in relation to the rest position of the vat base and/or a motion speed of the building platform and/or the size of an area of the last-hardened layer of the body is determined as a process parameter in the processing unit when the vat base is deflected from the rest position by movements of the building platform. The simulation model can determine the surface area of the last-hardened layer from the model data defining the body and from the progress of the construction process as process parameter. Thus, by comparing the predicted value or the simulation result with the measured variable detected by the sensor the said height of the building platform or of the last-hardened layer of the body, the movement speed of the building platform and/or the size of an area of the last-hardened layer of the body can be determined. For example, the volume of the chamber increases with increasing height of the building platform if the previously formed layers of the body adhere to the building platform and to the vat base. In addition, in this case the volume of the chamber changes more rapidly with increasing speed of the building platform. A larger area of the last-hardened layer of the body adhering to the vat base will change the volume of the chamber more rapidly during raising of the building platform than a smaller area of the last-hardened layer of the body adhering to the vat base.

It can further be provided that depending on the sensor signal provided by the sensor, a height adjustment of the building platform is controlled by means of a drive unit for the building platform which drive unit is connected thereto and to the processing unit and/or an irradiation of the substance which can be hardened by radiation is controlled by the processing unit by means of a control unit for the radiation source which control unit is connected to the processing unit and the radiation source as a process parameter. Thus, by comparing at least one predicted value or simulated value of the measured variable with at least one value of the measured variable detected by the sensor, the height adjustment of the building platform and/or the irradiation of the substance which can be hardened by radiation can be controlled as process parameters. Alternatively to determined detected values of the measured variable, a relative or absolute variation of the measured variable in the course of at least one subsection of the construction process can be used by the processing unit to control the aforesaid process parameters.

According to a further embodiment of the method, it can be provided that depending on the sensor signal provided by the sensor, a resting pressure in the chamber is set by means of at least one adjustable pressure source connected to the chamber and the processing unit and/or a temperature in the chamber is set by means of at least one adjustable heating device connected to the chamber and the processing unit and/or a supply of a process medium into the chamber is set by means of at least one adjustable process substance source connected to the chamber and the processing unit and/or an air flow in the chamber is set by means of at least one air flow source connected to the chamber and the processing unit as process parameters by the processing unit. Thus, by comparing at least one predicted value or simulated value of the measured variable with at least one value of the measured variable detected by the sensor, the resting pressure in the chamber, a temperature in the chamber, a supply of a process medium, for example, inhibitor medium into the chamber and/or an air flow in the chamber can be set or controlled as process parameters.

Preferably it can be provided that from the sensor signal provided by the sensor a release of a last-hardened layer of the body, which last-hardened layer adheres to the vat base, from the vat base and/or a release height and/or a release speed of a last-hardened layer of the body, the layer adhering to the vat base, from the vat base and/or a touching of the vat base and/or a contact pressure of a doctor blade which is movable in the vat, on the vat base and/or a body incorrectly released from the building platform and/or a vat ageing and/or an unexpected adhesion of the body on the vat base when supplying an inhibitor medium into the chamber and onto the substance which can be hardened by radiation and/or a fill level of the substance which can be hardened by radiation in the vat and/or a provision of the vat and/or a crack or hole in the vat base or in the chamber is determined as process parameter in the processing unit. During the release of a last-hardened layer of the body, the layer adhering to the vat base, from the vat base, the rapid volume reduction of the chamber as a result of the independent return of the flexible vat base into the rest position can be detected. In addition, the measured volume change in the chamber can be a measure for the release height or the release speed of a last-hardened layer of the body, the layer adhering to the vat base, from the vat base when the building platform is raised. During touching of the vat base, i.e. when the building platform is lowered downwards towards the vat base and comes into contact with this, the volume of the chamber decreases as soon as the building platform moves the vat base downwards compared with the rest position. Furthermore, the volume of the chamber decreases with increasing contact pressure of a doctor blade movable in the vat on the vat base. A body incorrectly released from the building platform which, for example, is only connected to the building platform at a body edge, i.e. is tilted and hanging downwards, will, on approaching the building platform on the vat base, already contact the vat base at a greater height than the predicted height of the building platform above the vat base and reduce the volume of the chamber. In addition, the elasticity of the vat base can change with increasing age of the vat, which can have an influence on the volume of the chamber. An unexpected adhesion of the body to the vat base during supply of an inhibitor medium into the chamber and further towards the substance which can be hardened by radiation also results in values of the volume of the chamber which differ from predicted volume values during raising of the building platform. The fill level of the substance which can be hardened by radiation in the vat can also be deduced with the value of the volume of the chamber since the hardenable substance presses onto the vat base. It can also be determined from the value of the volume of the chamber whether a vat was provided in the device (or however the "chamber" is open with respect to the surroundings). In particular, a crack or a hole in the vat base or in the chamber can be deduced from an unexpected volume change of the chamber (in particular an unexpected pressure variation in the case of a pressure sensor and an inherently closed chamber). In particular, the said process parameters can be determined by means of the processing unit from a measurement of a volume change of the chamber, in particular of the absolute or relative values of the pressure or of the change in the amount of substance or the rate of the pressure variation or of the variation in the amount of substance.

If, depending on the sensor signal provided by the sensor, a negative pressure deflecting the vat base away from the building platform is set in the chamber by the processing unit for the release of a last-hardened layer of the body, which layer adheres to the vat base, from the vat base, in particular during movement of the height-adjustable building platform away from the resting position of the vat base, the last-hardened layer of the body, which layer adheres to the vat base, can already be released at a lower height of the building platform or without raising the building platform from the vat base. The negative pressure which is produced during a reduction of the chamber volume and therefore pulls the vat base away from the building platform in addition to any restoring force of the vat base, thus assists the release of the layer of the body which layer adheres to the vat base. The value of the negative pressure is preferably detected with the sensor (in particular pressure sensor) and can be limited if necessary to avoid damage to the body to be produced or to the vat base due to excessive negative pressure or a too-rapid change in the pressure in the chamber.

If, depending on the sensor signal provided by the sensor in the chamber, an excess pressure of the inhibitor medium is set by the processing unit, the diffusion through the semi-permeable foil can be increased. The thickness of the inhibited substance layer which can be influenced thereby is an important process parameter and acts, for example, on the printing speed.

If, preferably depending on the sensor signal provided by the sensor, an excess pressure deflecting the vat base towards the building platform is set in the chamber by the processing unit before a touching of the building platform or the last-hardened layer of the body on the vat base, a pressure change in the chamber can be detected even before reaching the rest position of the vat base and the rest position of the vat base can be reached particularly precisely by lowering the building platform. The value of the excess pressure is preferably detected by the sensor (in particular pressure sensor) and based on this is regulated by the control unit in order to avoid damage to the vat base due to excessive excess pressure in the chamber.

In order to produce a layer of the body to be formed, it can be provided that the height-adjustable building platform with a last-hardened layer of the body adhering thereto and to the vat base is moved away from a rest position of the vat base, a release of the last-hardened layer of the body, which layer adheres to the vat base, from the vat base is determined in the processing unit by means of the sensor, the height-adjustable building platform is moved into a height above the rest position of the vat base which defines a distance between the last-hardened layer of the body to the rest position of the vat base in the extent of at least the thickness of the layer of the body, which layer is to be newly formed, and then the substance which can be hardened by radiation is hardened selectively by means of the radiation source by irradiation to form the new layer of the body. Thus, for this case the last-hardened layer of the body, which layer adheres to the vat base, is separated from the vat base, for example, by raising the building platform. The volume change of the chamber during the raising of the building platform and during separation of the last-hardened layer of the body from the vat base is favourably detected by the sensor. As soon as the separation was detected, the building platform can be moved downwards into the desired height above the vat base for which the building platform is driven, for example, by means of a step motor. The hardenable substance is then hardened in the space between the last-hardened layer of the body and the vat base by irradiation in order to form a new layer of the body. By this means the exposure of the hardenable substance takes place separately from the movement of the building platform (asynchronous mode without inhibiting layer).

In order to produce a layer of the body to be formed, it can be provided that an inhibitor medium is supplied via the chamber to the substance which can be hardened by radiation and the height-adjustable building platform with a last-hardened layer of the body, which layer adheres thereon (on the building platform), is moved into a height above the rest position of the vat base which defines a distance between the last-hardened layer of the body to the rest position of the vat base at least in the extent of the thickness of the layer of the body, which layer is to be newly formed, whilst at the same time as the movement of the height-adjustable building platform the substance which can be hardened by radiation is hardened selectively by means of the radiation source by irradiation to form the new layer of the body. In this case, the inhibitor medium prevents any adhesion of the last-hardened layer of the body to the vat base, with the result that no separation process of this layer from the vat base is required. The space requirement of the inhibitor medium is taken into account when specifying the height at which the building platform is moved above the vat base. Thus, the hardenable substance can already be irradiated during movement of the building platform into the desired height above the vat base. In this way, the method to produce the body is significantly accelerated. Thus, the exposure of the hardenable substance and the movement of the building platform take place simultaneously (synchronous mode).

In order to produce a layer of the body to be formed, it can also be provided that an inhibitor medium is supplied via the chamber to the substance which can be hardened by radiation and the height-adjustable building platform with a last-hardened layer of the body, which layer adheres thereon (on the building platform), is moved into a height above the rest position of the vat base which defines a distance between the last-hardened layer of the body to the rest position of the vat base at least in the extent of the thickness of the layer of the body, which layer is to be newly formed, and then the substance which can be hardened by radiation is hardened selectively by means of the radiation source by irradiation to form the new layer of the body. In this case, the inhibitor medium prevents any adhesion of the last-hardened layer of the body to the vat base with the result that no separation process of this layer from the vat base is required. The space requirement of the inhibitor medium is taken into account when specifying the height at which the building platform is moved above the vat base. The building platform can be moved into the desired height above the vat base and then the hardenable substance can be irradiated between the last-hardened layer of the body and the vat base. As a result of the omission of the separation process, the process to produce the body is substantially accelerated. Thus, the exposure of the hardenable substance takes place separately from the movement of the building platform (asynchronous mode with inhibiting layer).

BRIEF DESCRIPTION OF THE DRAWINGS

The invention will be explained in further detail hereinafter with reference to preferred, non-restrictive exemplary embodiments with reference to the drawings. In the figures:

FIG. 4 shows the device from FIG. 1 with an at least partially formed body adhering to the vat base;

FIG. 5 shows the device from FIG. 2 with an at least partially formed body adhering to the vat base;

FIG. 7 shows the device from FIG. 1 with an inhibiting layer;

FIGS. 20a and 20b show a release process of the last-hardened layer of one of three bodies from the vat base in two exemplary states;

DETAILED DESCRIPTION OF THE INVENTION

In the depicted figures, parts of the device which do not serve the description of the respective figure are omitted for the sake of clarity.

Those parts of the description which relate to a pressure measurement or detection of the pressure in the chamber should be understood under the condition that the sensor is a pressure sensor and the chamber is substantially closed. For explanations relating to the tightness of the substantially closed chamber, reference is made to the preceding description.

For the sake of clarity, most exemplary embodiments are shown and described in connection with a substantially closed chamber and a pressure sensor. If instead of a pressure measurement, a measurement of the flow of a quantity of substance is intended and possible, a flow sensor which is arranged in an inlet/outlet of the chamber for a fluid can naturally be used instead of the pressure sensor. Accordingly, those exemplary embodiments which are certainly shown and described in connection with a pressure sensor, which can however also be implemented in connection with a flow sensor, are valid for designs using a flow sensor as well.

Figure 1:
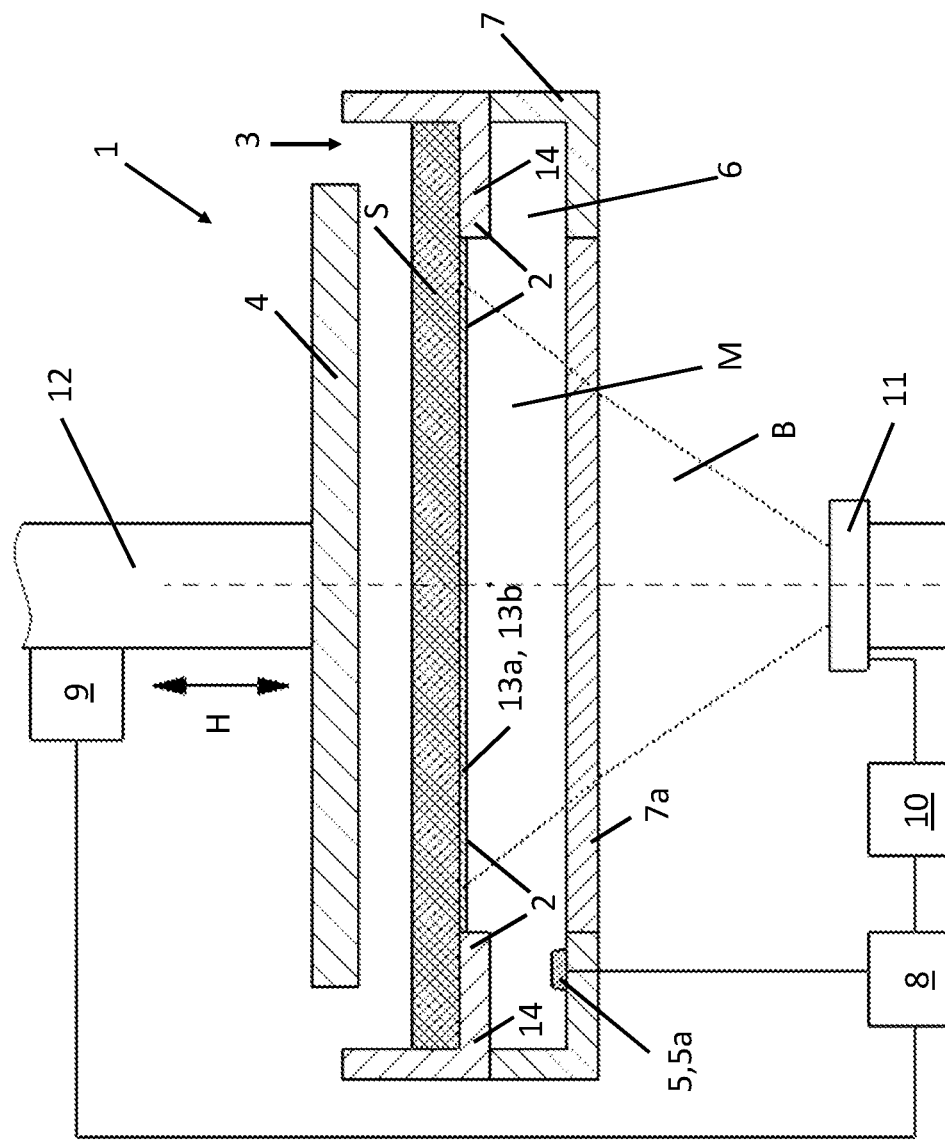
FIG. 1 shows a device according to the invention with a pressure sensor and a vat base without carrier plate.

FIG. 1 shows a device 1 for a system for layer-by-layer construction of a body K which is shown, for example, in FIG. 4 from a substance S which can be hardened by radiation, comprising a vat 3 having a vat base 2 for receiving the substance S which can be hardened by radiation. The vat base 2 is shown in its rest position, substantially flat. The device 1 also comprises a height-adjustable building platform 4, which is height-adjustable in relation to the vat base 2 and which is arranged above the vat base 2, and a sensor 5 cooperating with the vat base 2. The height-adjustable building platform 4 is adjustable in the direction indicated by the double arrow H, i.e. in the height, upwards and downwards in relation to the vat base 2 or generally in relation to the vat 3. The vat base 2 is configured to be flexible, at least partially in a subregion 13. A chamber 6 which is closed in FIG. 1 is provided below the vat 3 in order to cooperate with a sensor 5 configured as pressure sensor 5a. In another embodiment shown in FIG. 24, the chamber 6 can comprise an opening 34 for the inlet or outlet of a fluid received in the chamber 6, wherein the sensor 5 is then a flow sensor 5b. The chamber 6 is delimited from an underside of the vat base 2. Thus, the vat base 2 is a part of a chamber housing 7 of the chamber 6. The sensor 5 can detect a volume change of the chamber 6 and provide a sensor signal from which a sign of the volume change can be determined. The sensor 5 can in particular quantitatively detect a measured variable directly or indirectly proportional to the volume of the chamber or to the volume change of the chamber and provide the measured variable as sensor signal. In the example shown in FIG. 1, the sensor 5 is a pressure sensor 5a for detecting a pressure or a pressure change corresponding to the volume change of a compressible medium M received in the chamber 6. The chamber 6 is in this case configured to be closed. In another embodiment (FIG. 24) the sensor 5 can be a flow sensor 5b which is provided to detect a change in the amount of substance of the amount of substance contained in the chamber 6 of a fluid received in the chamber 6, wherein the change in the amount of substance corresponds to the volume change. The fluid can be a liquid or a gas and accordingly compressible or incompressible. For example, the sensor 5 is adapted to provide a detected pressure, a detected pressure change or a detected change in the amount of substance as a measured variable and sensor signal.

In the example shown in FIG. 1, a compressible medium M, for example, air is received in the chamber 6, wherein the sensor 5 is a pressure sensor 5a which is adapted to detect the pressure of the compressible medium M received in the chamber 6. Preferably the pressure sensor 5a is received in the chamber 6. In a special embodiment the pressure sensor 5a can also be configured as a sound transducer. The sensor 5 can be connected to a processing unit 8 which is adapted to process the sensor signal provided by the sensor 5, in particular the pressure detected by the pressure sensor 5a or the change in the amount of substance detected by the flow sensor 5b. The sensor 5 can be connected via the processing unit 8 to a drive unit 9 for the height-adjustable building platform 4 and/or to a control unit 10 for a radiation source 11 which is provided for irradiating the substance S which can be hardened by radiation. The processing unit 8 is adapted to control the drive unit 9 for the height-adjustable building platform 4 and/or the control unit 10 for the radiation source 11 depending on the sensor signal provided by the sensor 5. In other exemplary embodiments not shown, the processing unit 8 can also be connected only to the drive unit 9 for the height-adjustable building platform 4 or only to the control unit 10 for the radiation source 11 and be configured for the control thereof. The separating force required to separate the body K from the vat base 2, and which is introduced through the height-adjustable building platform 4 deflects the vat base 2 and thereby produces a volume change in the chamber 6. If the chamber 6 is closed for use with a pressure sensor 5a, the volume change brings about a pressure change in the chamber 6. If, on the other hand, the chamber 6 is partially open for use with a flow sensor 5b, the volume change brings about a flow (an inflow or outflow) of the fluid received in the chamber 6 for pressure equalization with the surroundings or with another chamber. With increasing radiation energy (product of exposure time and exposure intensity), which is introduced by the radiation source 11, the generated layer of the body K adheres more strongly to the vat base 2. An excessive exposure energy can be determined by comparing the predicted minimal pressure (=separation pressure) or flow with the actual separation pressure or flow. The drive unit 9 can, for example, comprise a controllable electric motor, in particular a step motor, which is in engagement with a height-adjustable rod 12 and is connected to the building platform 4 via the rod 12. The vat base 2 is at least partially permeable to radiation, i.e. at least partially permeable for the radiation emitted by the radiation source 11 onto the vat base 2, for example, light. Preferably the vat base 2 comprises a flexible tensioned foil 13a. The foil 13a is provided in the flexible subregion 13. Favourably the foil 13a is configured to be at least partially permeable to radiation, in particular permeable to light. In the example shown in FIG. 1, the foil 13a is tensioned between fixed edge parts 14 of the vat base 2. If, as in the example shown in FIG. 1, the radiation source 11 is arranged outside, in particular below the chamber 6, the chamber base 7a of the chamber housing 7 is expediently configured to be at least partially permeable to radiation, in particular permeable to light. An exemplary radiation cone B can be identified in FIG. 1.

Figure 2:
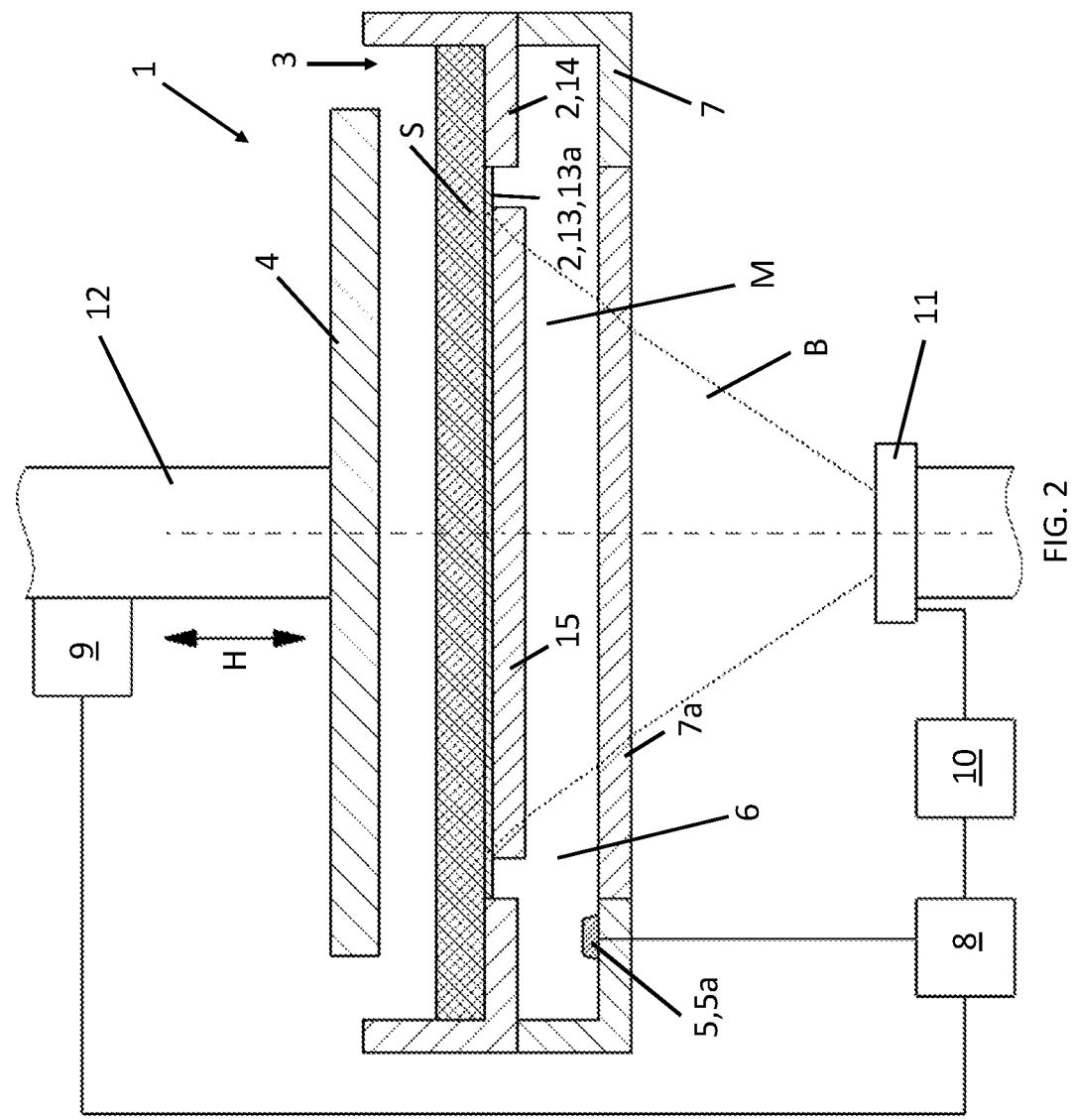
FIG. 2 shows a device according to the invention with a pressure sensor and a vat base with carrier plate.

FIG. 2 shows the device 1, wherein at least a part of the vat base 2, in particular the flexible subregion 13, particularly preferably the foil 13a, rests on a carrier plate 15 which is at least partially permeable to radiation, in particular transparent. In the depicted rest position the carrier plate 15 thus supports an underside of the foil 13a. The foil 13a or the vat base 2 is shown substantially flat in this rest position. The carrier plate 15 can be configured to be permeable for a process medium Mp, in particular an inhibitor medium Mi and/or comprise elevations 16 resting on the vat base 2 for the passage of a process medium Mp, in particular inhibitor medium Mi, between the elevations 16. The elevations 16 resting on the vat base 2 can in particular rest on the flexible subregion 13 of the vat base 2, preferably on the foil 13a. The process medium Mp or inhibitor medium Mi, for example, oxygen, is received in the chamber 6.

If a closed vat construction enables a negative volume change of the chamber 6, e.g. due to a slight sagging of the vat 3, more precisely of the vat base 2, an increase in the pressure can be detected. As a result, for example, the fill level of the hardenable, e.g. photosensitive substance S in the vat 3 can be deduced. Furthermore, the zero position of the vat base 2 relative to the carrier plate 15 can be measured, since a specific collision of the carrier plate 15 with the flexible vat base 2 after its separation from a body K results in a measurable pressure gradient.

Figure 3:
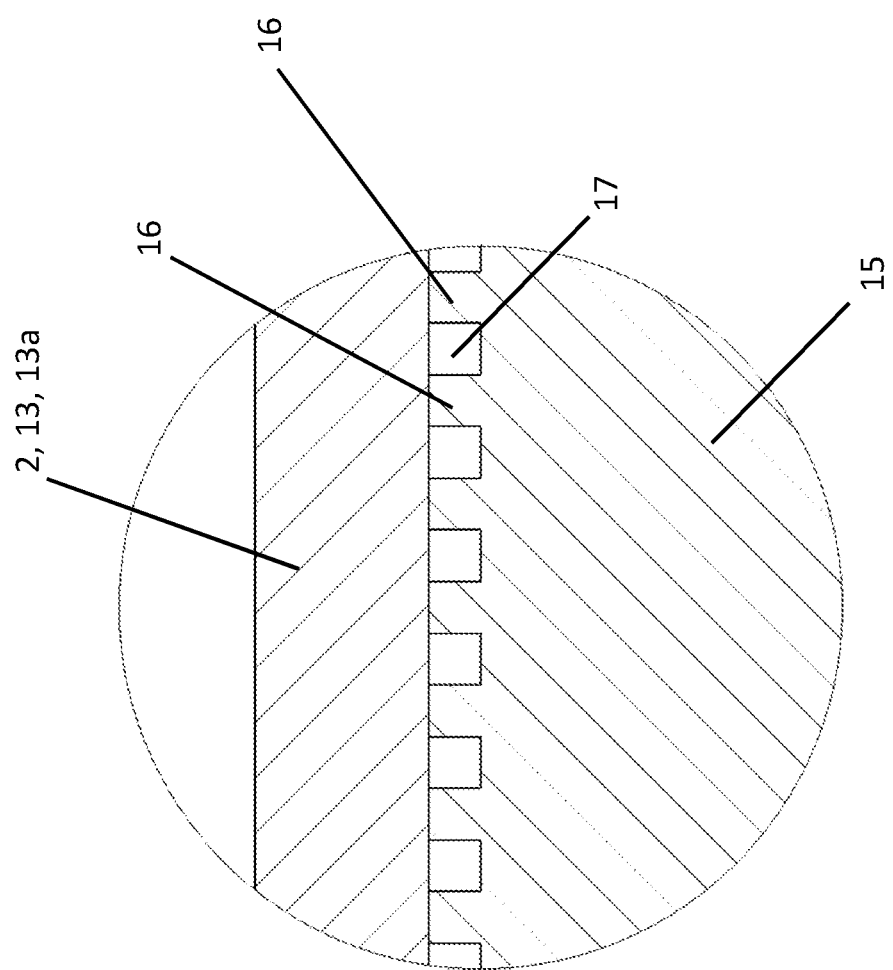
FIG. 3 shows a carrier plate with elevations resting on the vat base.

FIG. 3 shows a section of a carrier plate 15 with elevations 16 which rest on the vat base 2. Between the elevations 16 there extend recesses 17 in which the process medium Mp, for example, the inhibitor medium Mi can flow. The recesses 17 can, for example, be formed as groove-shaped indentations between strip-shaped elevations 16. If the carrier plate 15 is additionally configured to be permeable for the process medium Mp, in particular inhibitor medium Mi, channels, not shown, can be provided in the carrier plate 15 for conducting the process medium Mp, in particular inhibitor medium Mi. The carrier plate 15 can also be configured to be porous.

FIG. 4 shows the device 1 with an at least partially formed body K. The body K comprises a plurality of layers K1 to Kn which were formed by local hardening of the hardenable substance S with radiation. The body K adheres with the layer K1 formed as the first layer on the building platform 4 and—in the situation depicted before release—with the last formed layer Kn on the vat base 2, in particular on the foil 13a. In the depicted state the building platform 4 has already been moved a small distance upwards, i.e. in the positive z direction and away from the vat 3, with the result that the foil 13 is deflected from its rest position at least in a subregion. As a result of the deflection, the volume of the chamber 6 is enlarged. This corresponds to a positive sign ("+") of the volume change. Consequently (at constant temperature and constant amount of substance, i.e. closed chamber), the pressure in the chamber 6 decreases. The pressure sensor 5a is adapted to detect this pressure change and transmit a corresponding signal to the processing unit 8. Likewise, a flow sensor 5b cooperating with a partially open chamber 6 (not shown in FIG. 4) can detect a change in the amount of substance in the chamber 6, which change in the amount of substance corresponds with the increase in the volume of the chamber 6. In particular, in the case of the open chamber 6 fluid is sucked into the chamber 6 due to the deflection of the foil 13a. The flow sensor 5b can also transmit a corresponding signal to the processing unit 8. For the sake of clarity, in FIG. 4 and in subsequent figures, the processing unit 8, the drive unit 9 and the control unit 10 are not shown.

Unlike FIG. 4, a carrier plate 15 is provided in FIG. 5 on which the vat base 2, in particular the foil 13a can rest. As can be seen in the depicted situation with deflected vat base 2, the vat base 2, more precisely the foil 13a, rests only loosely on the carrier plate 15 and can be raised therefrom under the action of an adhering body K. As a result of the indentations 17 in the carrier plate 15, a pressure equalization can take place inside the chamber 6, i.e. between the space between carrier plate 15 and foil 13a on the one hand and the chamber 6 underneath the carrier plate 15 on the other hand. The deflection of the vat base 2 thus results in a pressure change which can be detected by the pressure sensor 5a or a change in the amount of substance which can be detected by the flow sensor 5b. Also in FIG. 5 instead of the pressure sensor 5a in the closed chamber 6, a flow sensor 5b can be provided in a partially open chamber 6 (not shown in FIG. 5).

Figure 6A:
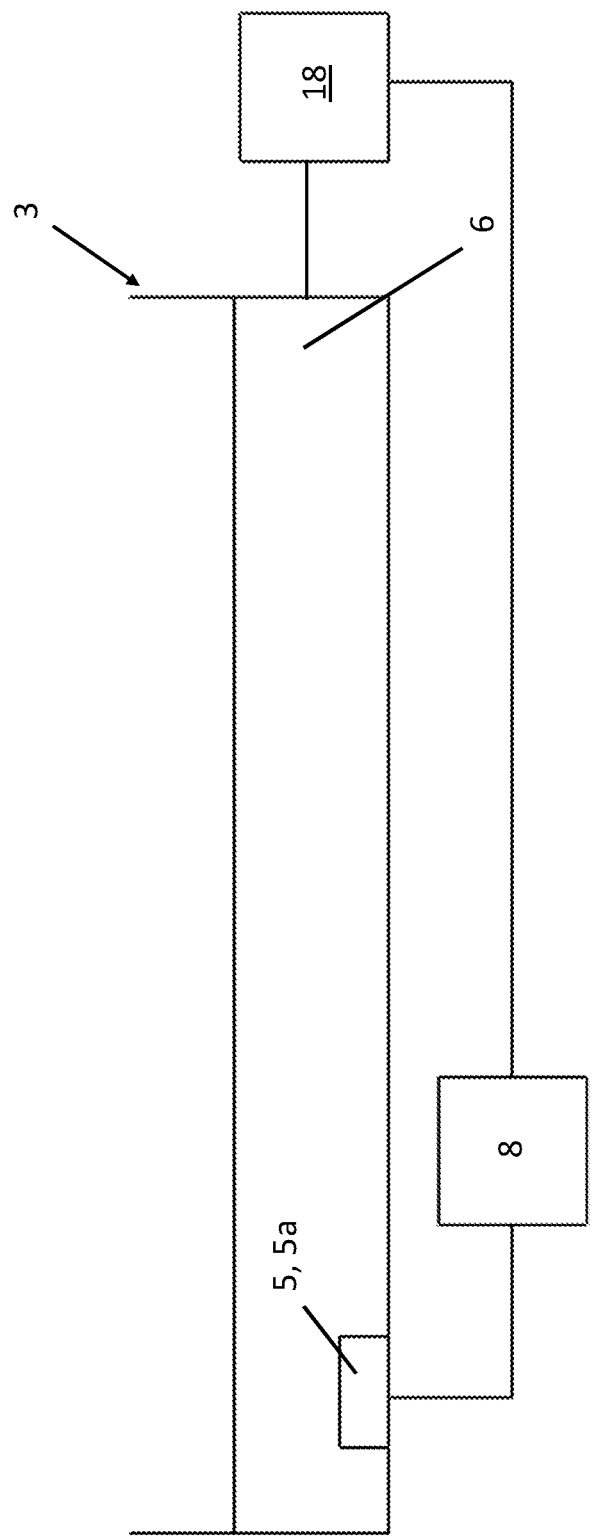
FIGS. 6a to 6d show the device from FIG. 2 in each case with an adjustable pressure source, an adjustable heating device, an adjustable process substance source (inhibitor source) and an air flow source.

FIG. 6a shows in simplified form the device 1 in which the chamber 6 as closed chamber 6 is connected, for example, to at least one adjustable pressure source 18 for setting a resting pressure in the chamber 6 and the pressure sensor 5a is connected via the processing unit 8 to the adjustable pressure source 18.

Figure 6B:
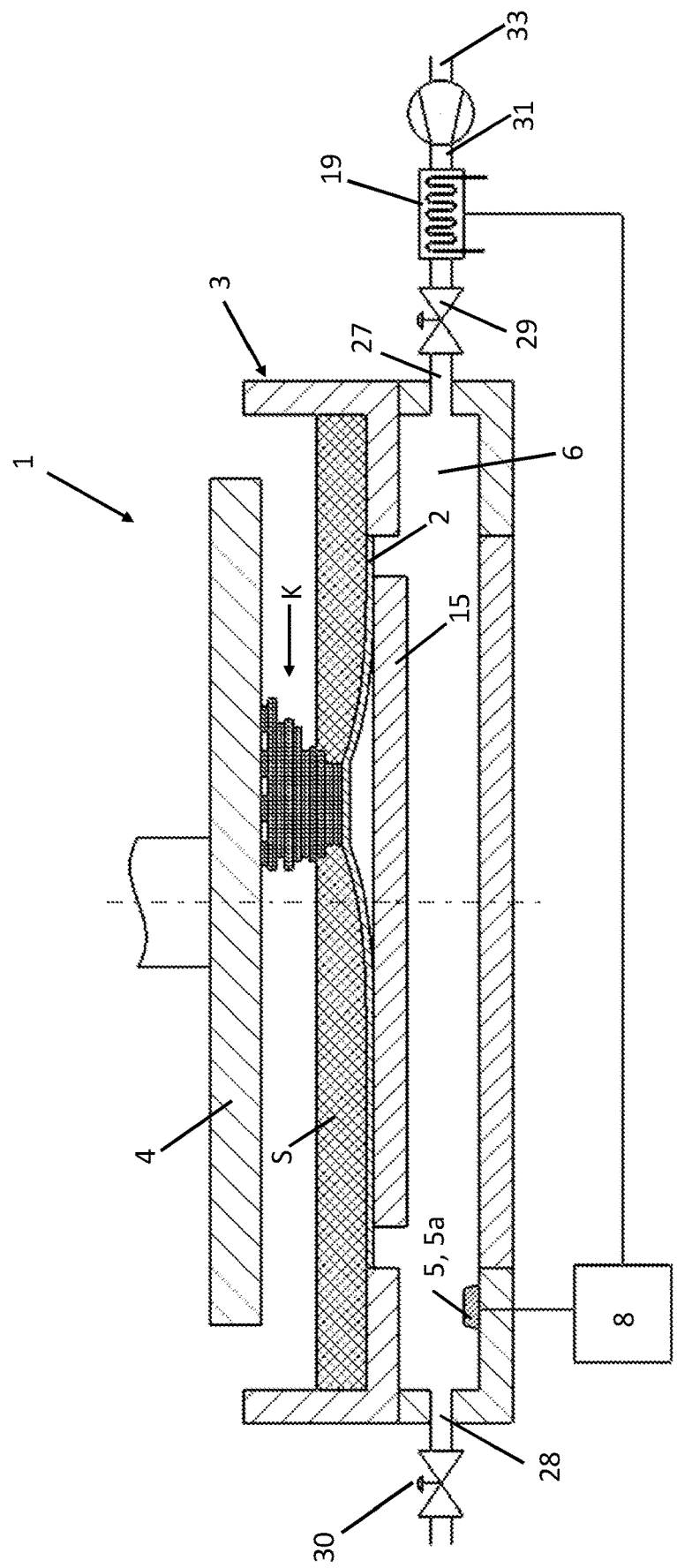

FIG. 6b shows the device 1 in which the chamber 6, for example, is connected to an adjustable heating device 19 (or generally to a heat exchanger) to set a temperature in the chamber 6 and the pressure sensor 5a is connected via the processing unit 8 to the adjustable heating device 19. In this example, the chamber 6 comprises an inlet 27 and an outlet 28. The inlet 27 and the outlet 28 can each be closed by a valve 29, 30, in particular a magnetic valve in each case. The heating device 19 is arranged in a supply line 31 between a compressor 32 and the valve 29 upstream of the inlet 27. In order to change the temperature in the chamber 6, the compressor 32 can be activated at least temporarily in order to suck, e.g. ambient air through the orifice 33. At the same time, the valves 29, 30 are opened to approximately the same extent so that compressible medium can emerge from the chamber 6 through the outlet 28 and be replaced by the compressible medium flowing subsequently through the inlet 27, wherein the after-flowing medium has been heated immediately previously in the heating device 19. As a result of the mixing of the compressible medium in the chamber 6, a uniform temperature is rapidly established as a result of the flow. In this case, it can be favourable if a device is provided for measuring the temperature in the chamber 6 and is optionally connected to the processing unit 8. The heating device 19 is therefore used, for example, for indirect heating of the hardenable substance S. As soon as a desired temperature is reached, the valves 29, 30 are closed again. When evaluating the pressure changes detected by the pressure sensor 5a, the state of the valves 29, 30 (i.e. closed or open or partially open) is taken into account to be able to correctly assign the cause for the pressure changes.

Figure 6C:
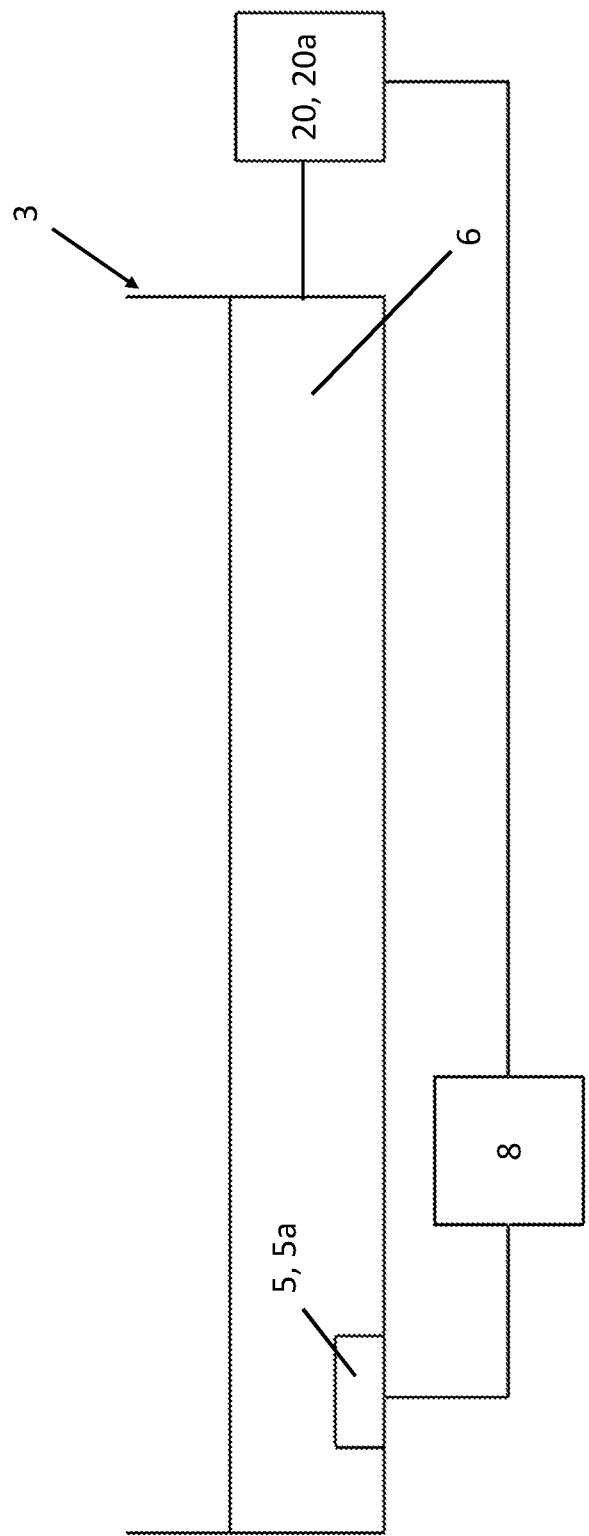

FIG. 6c shows in simplified form the device 1 in which the chamber 6 is connected, for example, to an adjustable process substance source 20, in particular inhibitor source 20a, for the adjustable supply of a process medium Mp, in particular inhibitor medium Mi, into the chamber 6 and the pressure sensor 5a is connected via the processing unit 8 to the adjustable process substance source 20, in particular inhibitor source 20a. The process substance source 20 is used for at least local manipulation of the solidification process of the substance S which can be hardened by radiation in the vat 3. Since in this case, the vat base 2 can be at least slightly permeable for the process medium Mp, this variant can manage only with an inlet and without an outlet. If the sensor 5 is designed as a flow sensor 5b, it can be arranged in a connecting line between the process substance source 20 and the chamber 6. In this case, the volume change is concluded by means of mass balance; this is proportional to the difference between inflowing and outflowing medium.

Figure 6D:
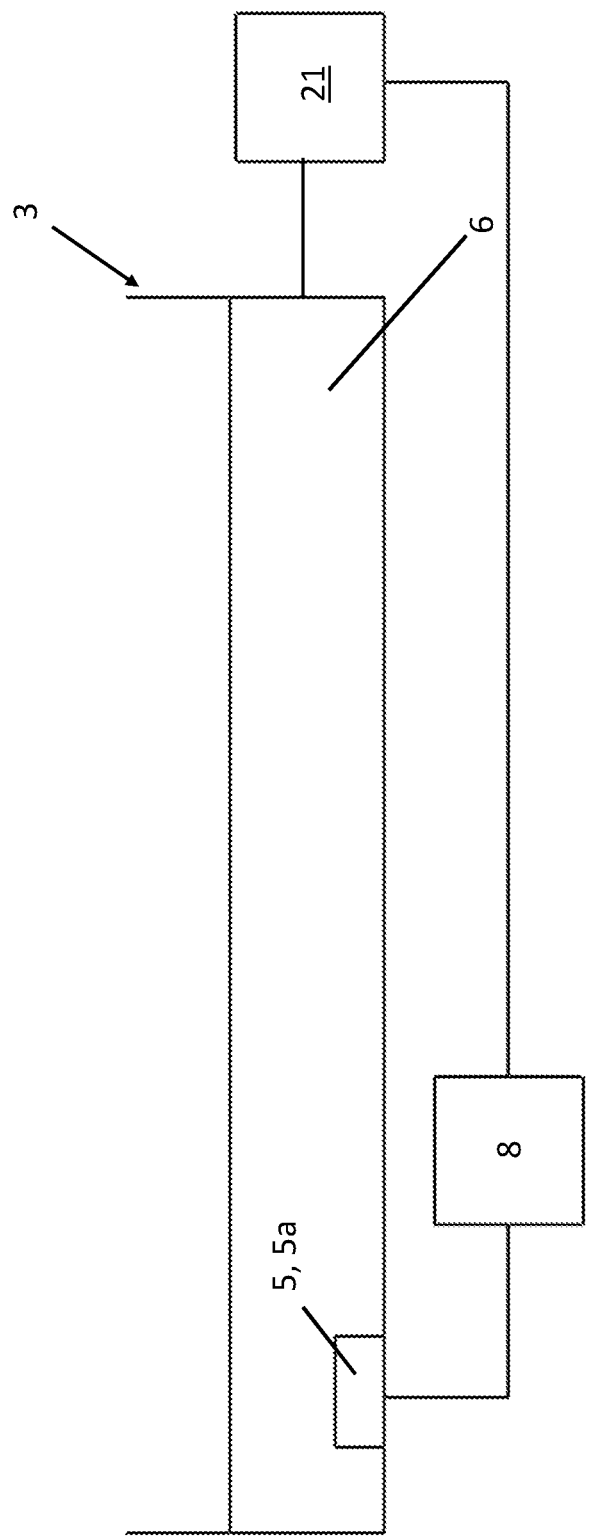

FIG. 6d shows in simplified form the device 1 in which the chamber 6 is connected, for example, to an air flow source 21 to produce an air flow in the chamber 6 and the pressure sensor 5a is connected via the processing unit 8 to the air flow source 21. The air flow source 21 is used, for example, for mixing the compressible medium M received in the chamber 6. As in FIG. 6c, a flow sensor 5b arranged in a connecting line between the air flow source 21 and the chamber 6 can also be used as sensor 5.

Naturally the chamber 6 of the device 1 can be connected to a plurality of the adjustable pressure source 18 the adjustable heating device 19, the adjustable process substance source 20 and the air flow source 21. The processing unit 8 is preferably adapted to control the pressure source 18 and/or the heating device 19 and/or the process substance source 20 and/or the air flow source 21 depending on the sensor signal provided by the sensor 5. Furthermore, the processing unit 8 can preferably be adapted to control one or more members of the group consisting of inlet valve 29, outlet valve 30 and compressor 32.

FIG. 7 shows the device 1 with an inhibiting layer I formed by the inhibitor medium Mi. The inhibiting layer I is formed in the depicted example between the vat base 2 and the hardenable substance S. For this purpose the inhibitor medium Mi is introduced through an access (not shown in FIG. 7) into the chamber 6. In order to be able to supply the inhibitor medium Mi to the hardenable substance S, the vat base 2, in particular the foil 13a is preferably configured to be semi-permeable, for the inhibitor medium Mi or generally permeable for a process medium Mp. The inhibitor medium Mi or the inhibiting layer I formed thereby reduces the adhesive force by means of which the last formed layer Kn of the body K adheres to the vat base 2, in particular to the foil 13a. Preferably the inhibitor medium Mi or the inhibiting layer I prevents such an adhesion. The example shown in FIG. 7 can also be implemented with a flow sensor 5b in a partially open chamber 6 instead of the pressure sensor 5a in the closed chamber 6. In this case, the delta of the inflowing and outflowing medium corresponds to the volume change.

A temperature control of the chamber 6 is used, for example, to accelerate the diffusion process of the inhibitor medium Mi through the semi-permeable layer (foil 13a) but also the heating of the hardenable substance S in the vat 3. The temperature in the chamber 6 influences the temperature of the substance S and therefore the viscosity and the reactivity of the hardenable substance S to radiation.

Figure 8:
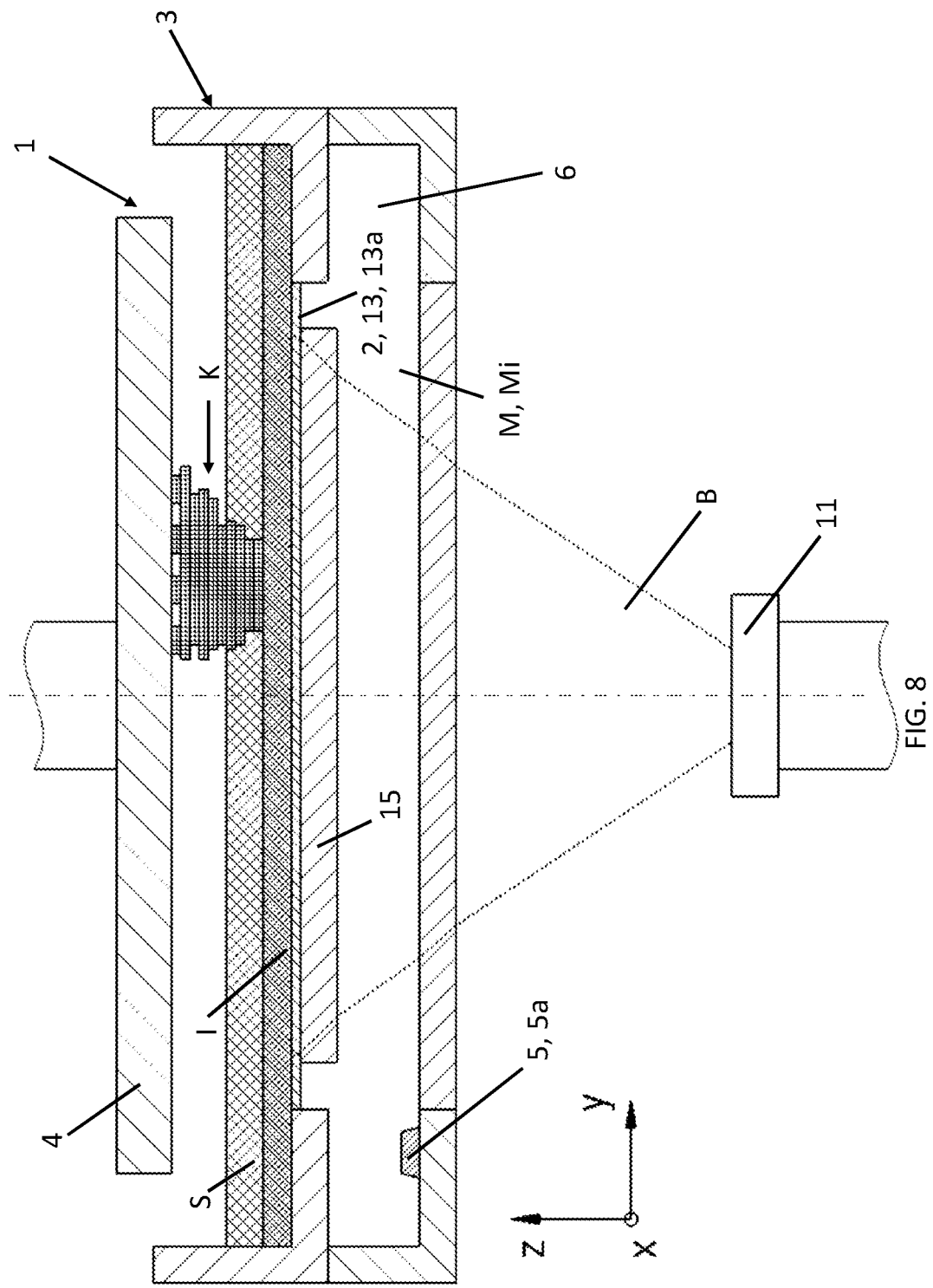
FIG. 8 shows the device from FIG. 2 with an inhibiting layer.

Unlike FIG. 7, in FIG. 8 a carrier plate 15 is provided on which the vat base 2, in particular the foil 13a, can rest. In this case, it is expedient if the carrier plate 15 is configured to be permeable for the inhibitor medium Mi or generally a process medium Mp and/or comprises elevations 16 resting on the vat base 2 for passage of the inhibitor medium Mi or process medium Mp between the elevations 16.

Figure 9:
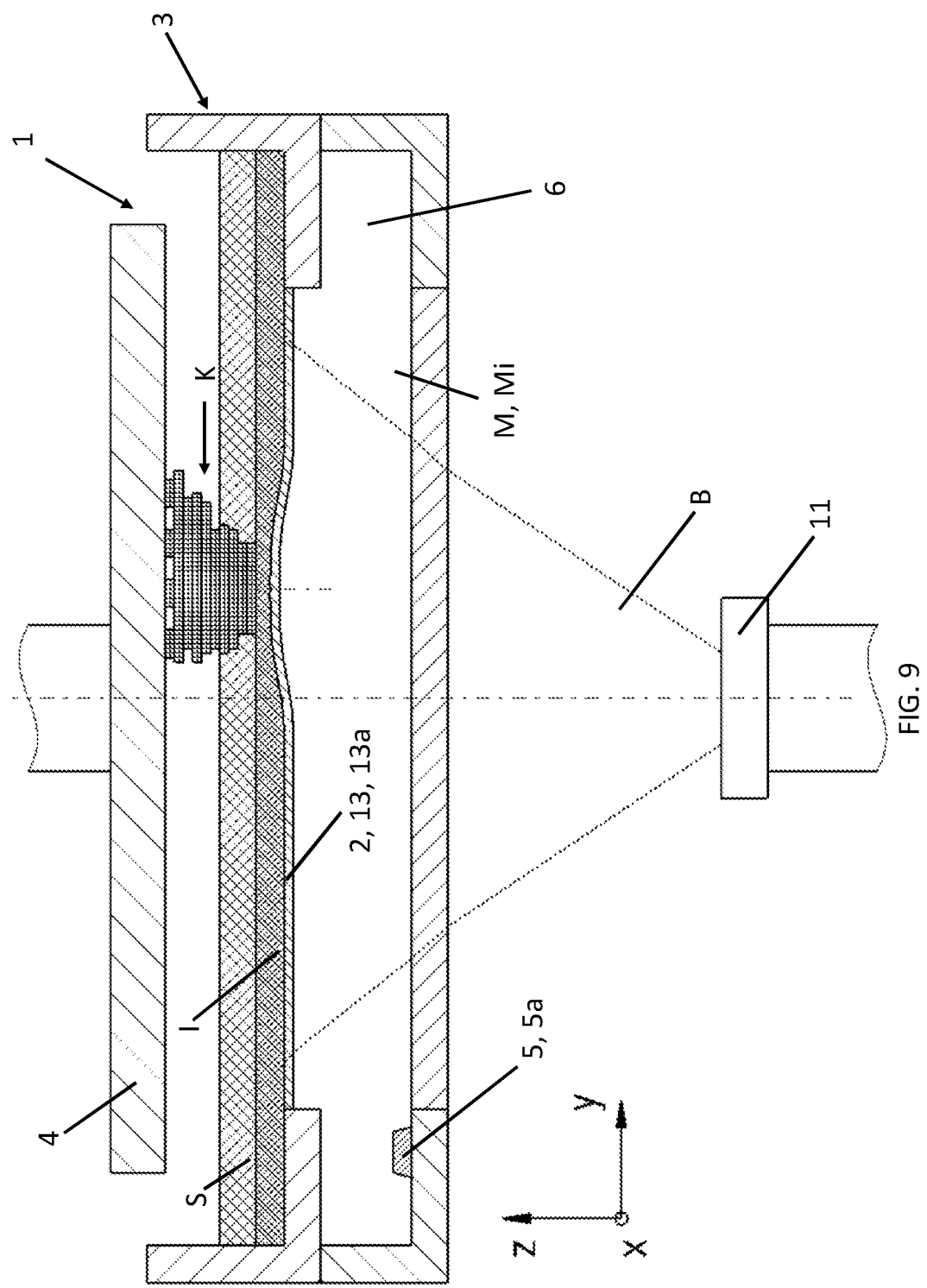
FIG. 9 shows the device from FIG. 7 with a partially depleted inhibiting layer.

FIG. 9 shows the device 1 in which the inhibiting layer I underneath the body K is partially depleted. This is indicated by the upwards curvature of the foil 13*a* and therefore by the thinner configuration of the inhibiting layer I underneath the body K.

Figure 10:
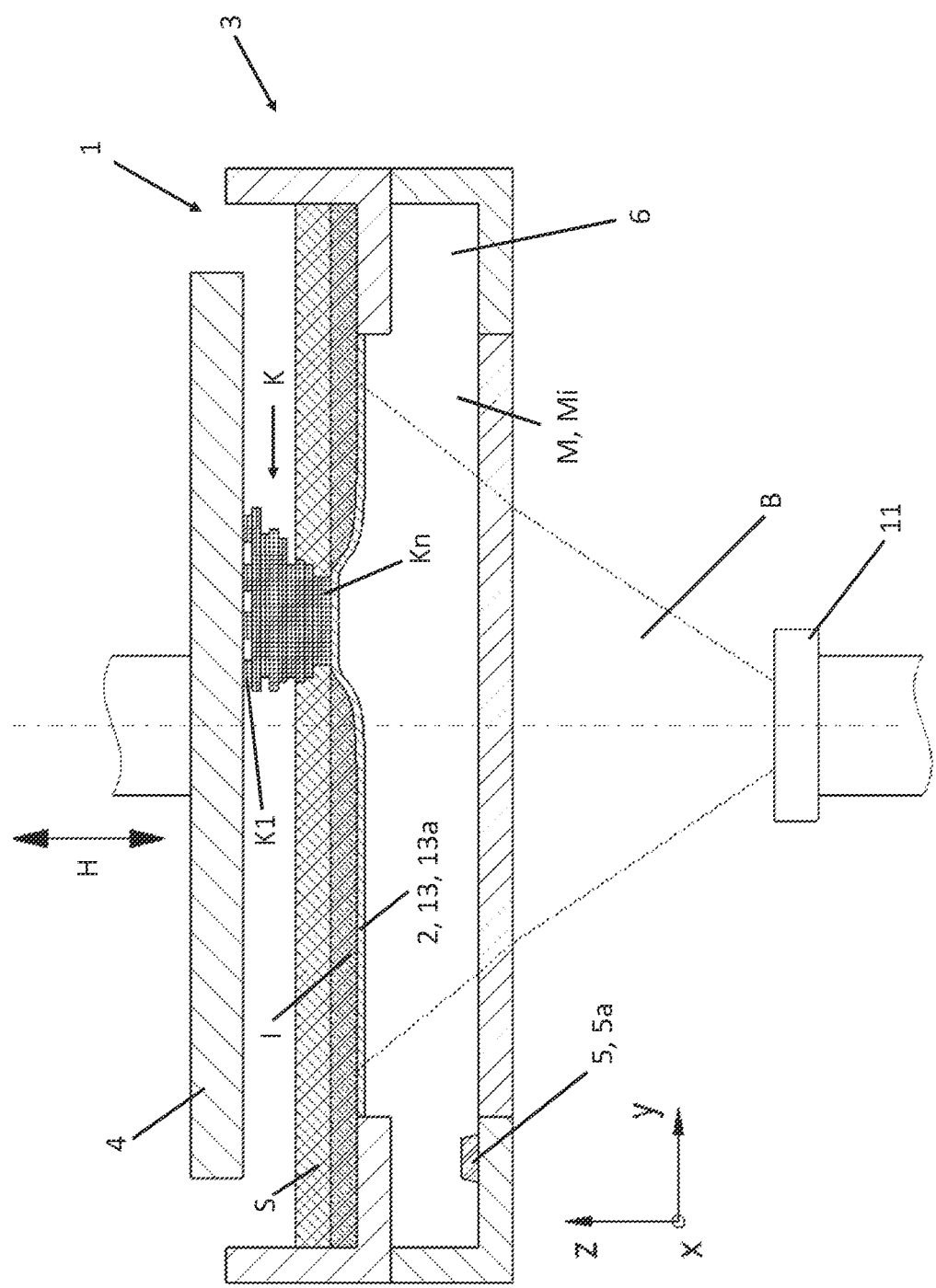
FIG. 10 shows the device from FIG. 9 with an even more severely depleted inhibiting layer.

In the example shown in FIG. 10, the inhibiting layer I is completely depleted underneath the body K which is why the last-formed layer Kn of the body K adheres to the vat base 2, in particular to the foil 13*a*, in an undesirable manner.

The situations according to FIG. 9 and FIG. 10 can be distinguished by the different deflections of the foil 13*a* and the resulting different changes in the volume by means of the volume change detected by the sensor 5. If the sensor 5 is a pressure sensor 5*a* cooperating with a closed chamber 6, the different changes of the pressure in the chamber 6 can be distinguished by means of the pressure change detected by the pressure sensor 5*a*. The processing unit 8 can therefore signal, for example, a deficiency of inhibitor medium Mi or preferably independently provide for a timely replenishment or distribution of the inhibitor medium Mi into/in the chamber 6, e.g. by controlling a corresponding inhibitor source 20.

Figure 11:
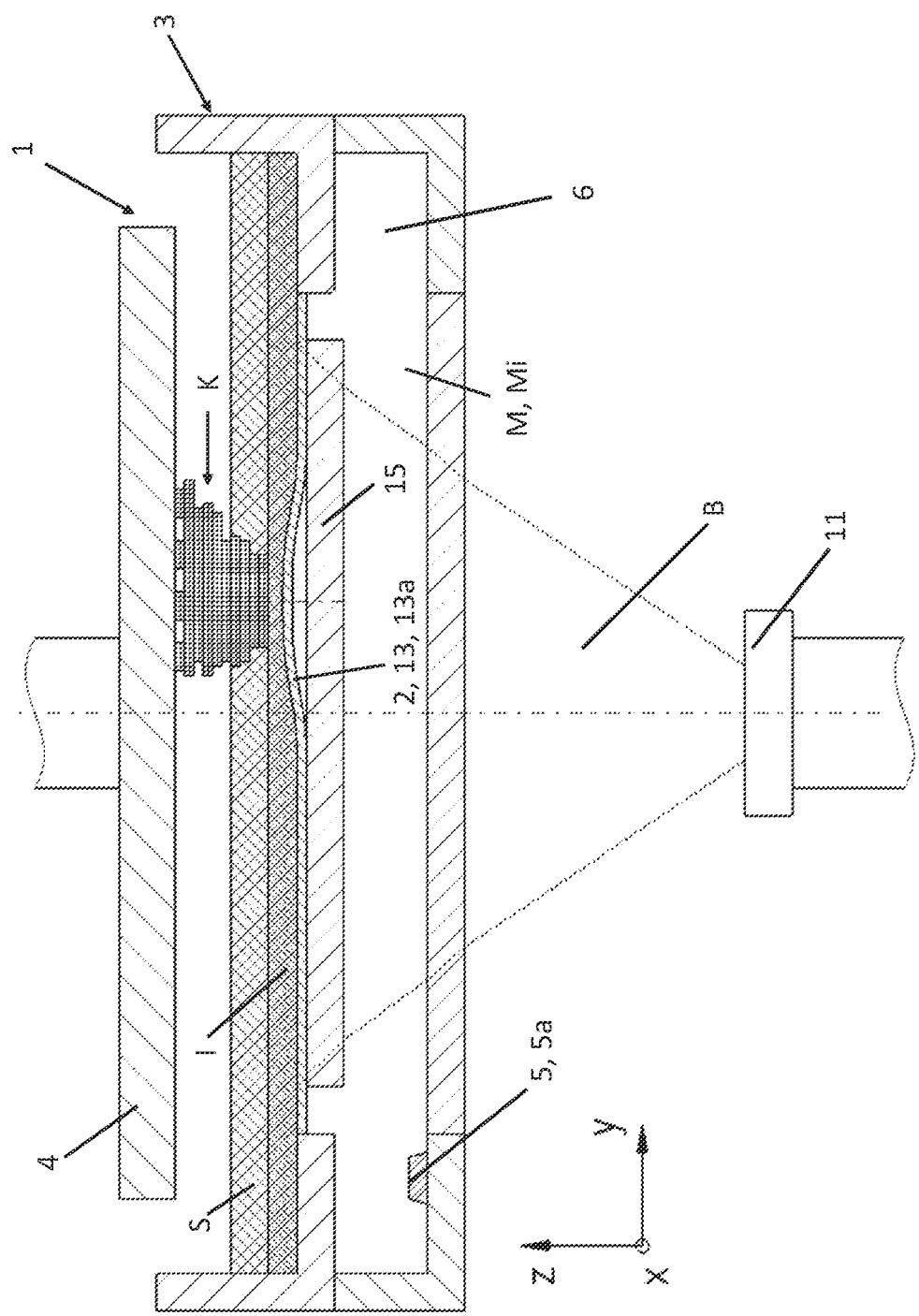
FIG. 11 shows the device from FIG. 8 with a partially depleted inhibiting layer.

Unlike FIG. 9, a carrier plate 15 is provided in FIG. 11, on which the vat base 2, in particular the foil 13*a* can rest. As a result of the elevations 16 and indentations 17, the carrier plate 15 does not make any change to the fundamental operating mode as described above with regard to the distribution of the inhibitor medium Mi.

Figure 12:
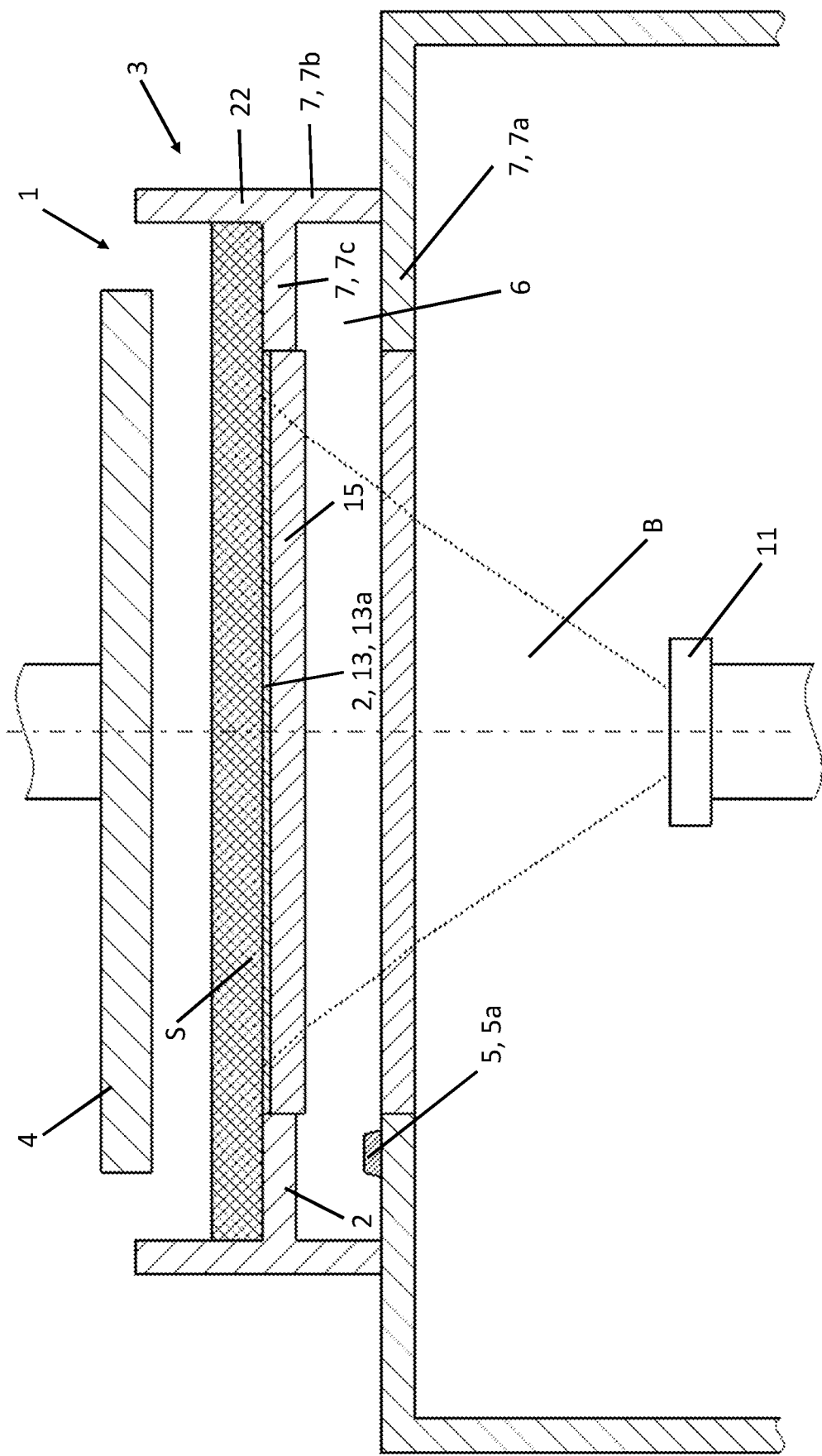
FIG. 12 shows a device according to the invention in which the vat base is an openable, in particular removable cover of a chamber housing of the chamber.

FIG. 12 shows the device 1 in an embodiment in which the vat base 2 is an openable, in particular removable cover 22 of the chamber housing 7 of the chamber 6. In this variant the chamber 6 is only closed by incorporation of the vat 3 into the system. In this case, the chamber housing 7 consists of a chamber base 7*a*, side parts 7*b* and a chamber upper part 7*c*. The vat base 2 as cover 22 of the chamber housing 7 can form the chamber upper part 7*c* and the side parts 7*b* as in the example shown in FIG. 12. Thus, the cover 22 is placed on the chamber base 7*a* which is formed by a support surface of the system. The support surface forming the chamber base 7*a* is here at the same time part of the machine housing of a production machine. In another embodiment, the cover 22 can only form the chamber upper part 7*c* and is placed on the side parts 7*b* and on the chamber base 7*a*. Alternatively to the closed chamber 6 shown as an example in FIG. 12, the chamber 6 can be configured to be partially open in order to cooperate with a flow sensor 5*b*.

Figure 13:
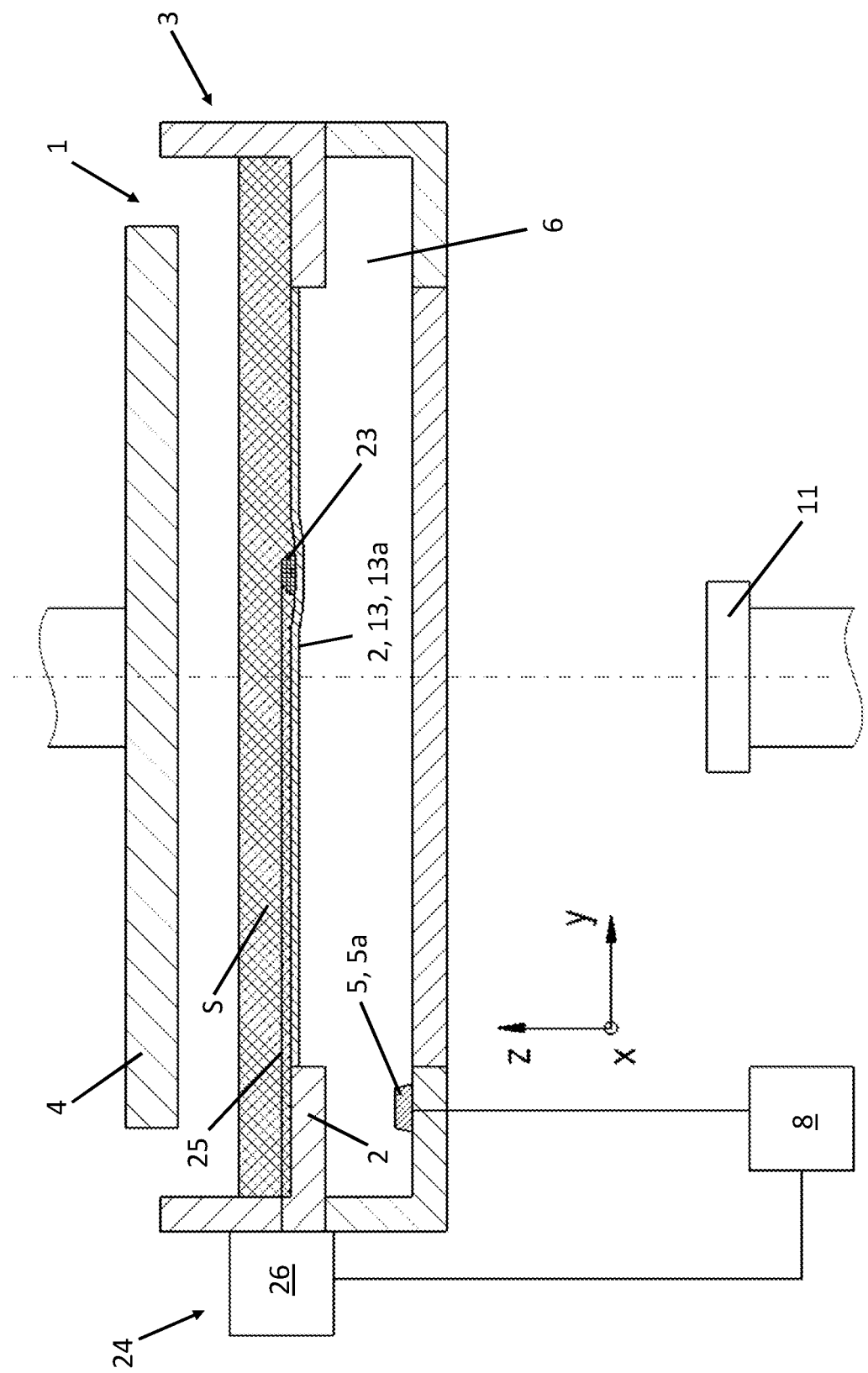
FIG. 13 shows the device from FIG. 1 with a doctor blade on the vat base.

FIG. 13 shows the device 1 with a movable doctor blade 23 in the vat 3 on the vat base 2, in particular on the foil 13*a*. Preferably the sensor 5, i.e. the pressure sensor 5*a* or the flow sensor 5*b* is connected via the processing unit 8 to a drive unit 24 of the doctor blade 23. In the example shown in FIG. 13, the drive unit 24 of the doctor blade 23 is a rod 25 received displaceably in the vat 3 which rod 25 is moved by a motor 26 controlled by the processing unit 8. The processing unit 8 is, for example, adapted to control the drive unit 24 (motor 26) of the doctor blade 23 depending on the sensor signal detected by the sensor 5, i.e. the pressure in the chamber 6 detected by the pressure sensor 5*a* or the change in the amount of substance in the chamber 6 detected by the flow sensor 5*b*.

Figure 14:
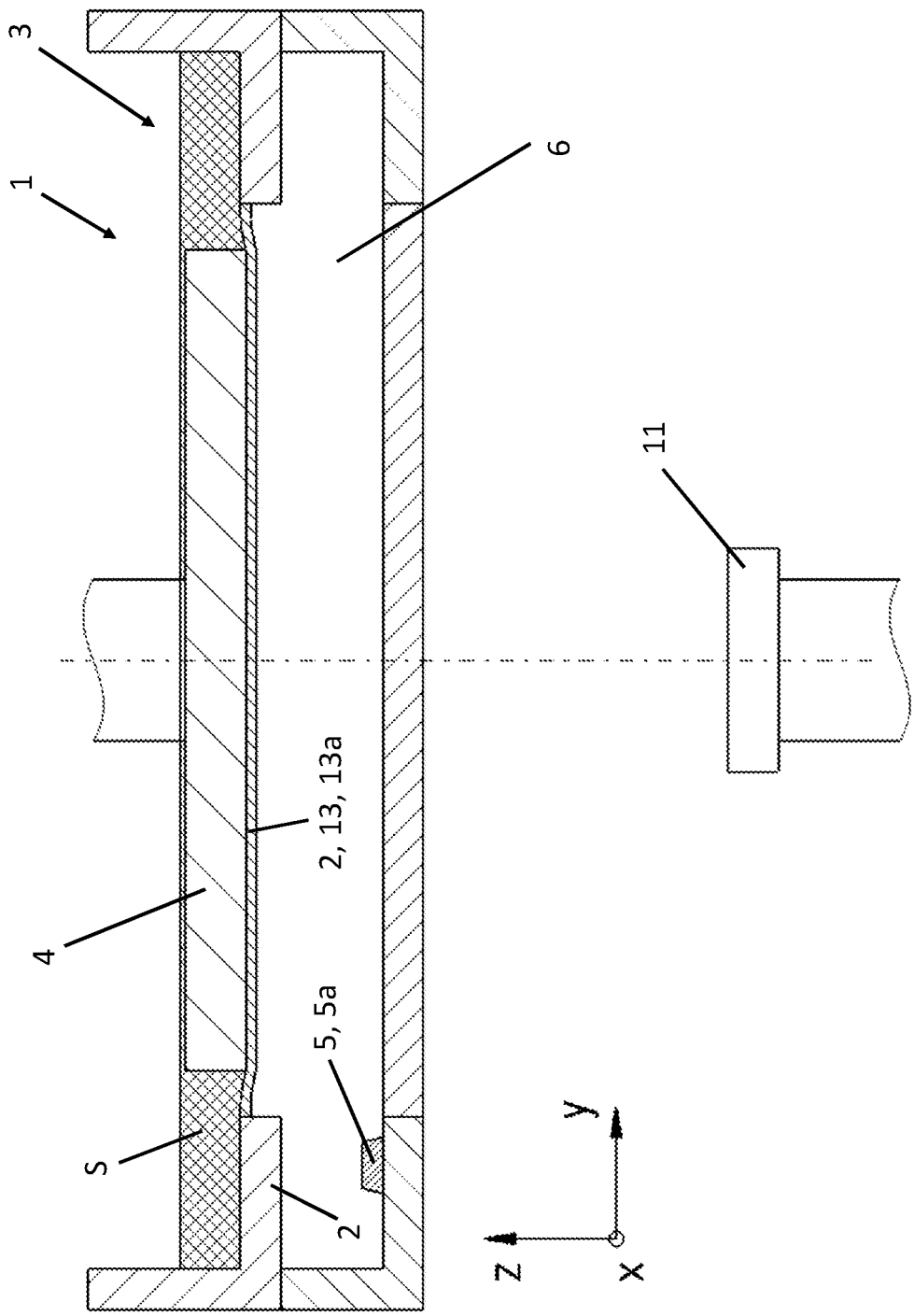
FIG. 14 shows the device from FIG. 1 with a building platform touching the vat base.

FIG. 14 shows the device 1 in a state in which the building platform 4 lowered in the negative z-direction touches the vat base 2, in particular the foil 13*a*. Touching is understood to be a contact of the vat base 2 or the foil 13*a* by the building platform 4 or by the last-hardened layer Kn of the body K without significant deflection or with minimal deflection of the vat base 2 or the foil 13*a*. Any further lowering of the building platform 4 would result in a volume change in the chamber 6 (i.e. a reduction in the volume and a resulting increase in the pressure in a closed chamber 6 or a resulting reduction in the amount of the fluid in the partially open chamber 6) which can be measured by the sensor 5 (pressure sensor 5*a* or flow sensor 5*b*).

Figure 15:
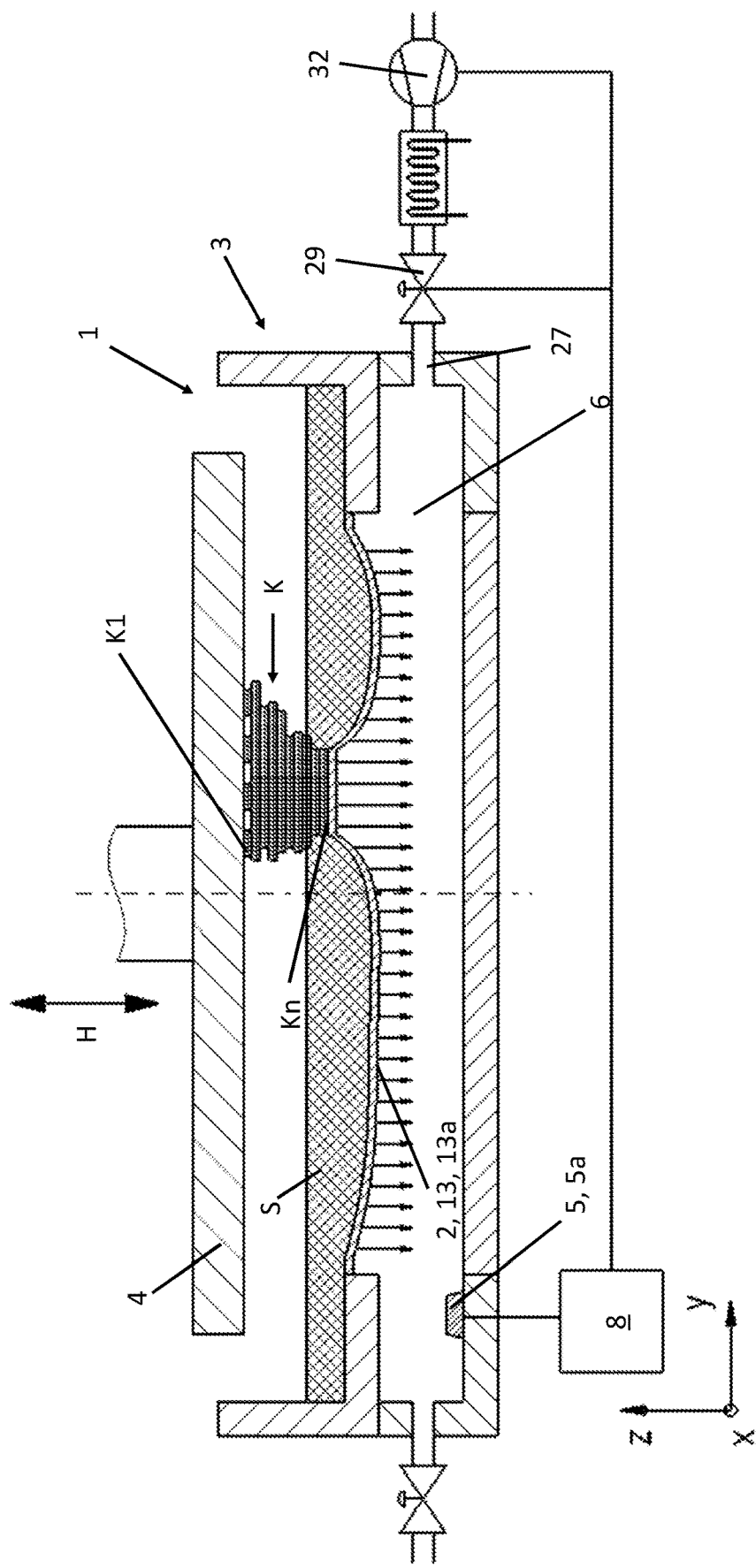
FIG. 15 shows the device from FIG. 1 with a negative pressure in the chamber which deflects the vat base away from the building platform.

FIG. 15 shows the device 1 in a state in which a negative pressure which deflects the vat base 2 away from the building platform 4 was established in the chamber 6 by the processing unit 8 for the release of a last-hardened layer Kn of the body K, which layer adheres to the vat base 2, from the vat base 2, in particular during a movement of the height-adjustable building platform 4 away from the rest position of the vat base 2. In the example shown in FIG. 15 the building platform 4 had already been moved a short distance upwards in the positive Z direction. The negative pressure in the chamber 6 is set depending on the pressure detected by the sensor 5 in particular pressure sensor 5*a* in the chamber 6. For this purpose, the pressure sensor 5*a* is connected via the processing unit 8 to a compressor 32 connected to the chamber 6. The compressor 32 can preferably be operated in both directions, i.e. to produce an excess pressure or a negative pressure in the chamber 6, as soon as the valve 29 in front of the inlet 27 is opened. The negative pressure is indicated in FIG. 15 by vertically downward-directed arrows. In order to produce the negative pressure in the chamber 6, this is configured to be closed or at least closable.

Figure 16:
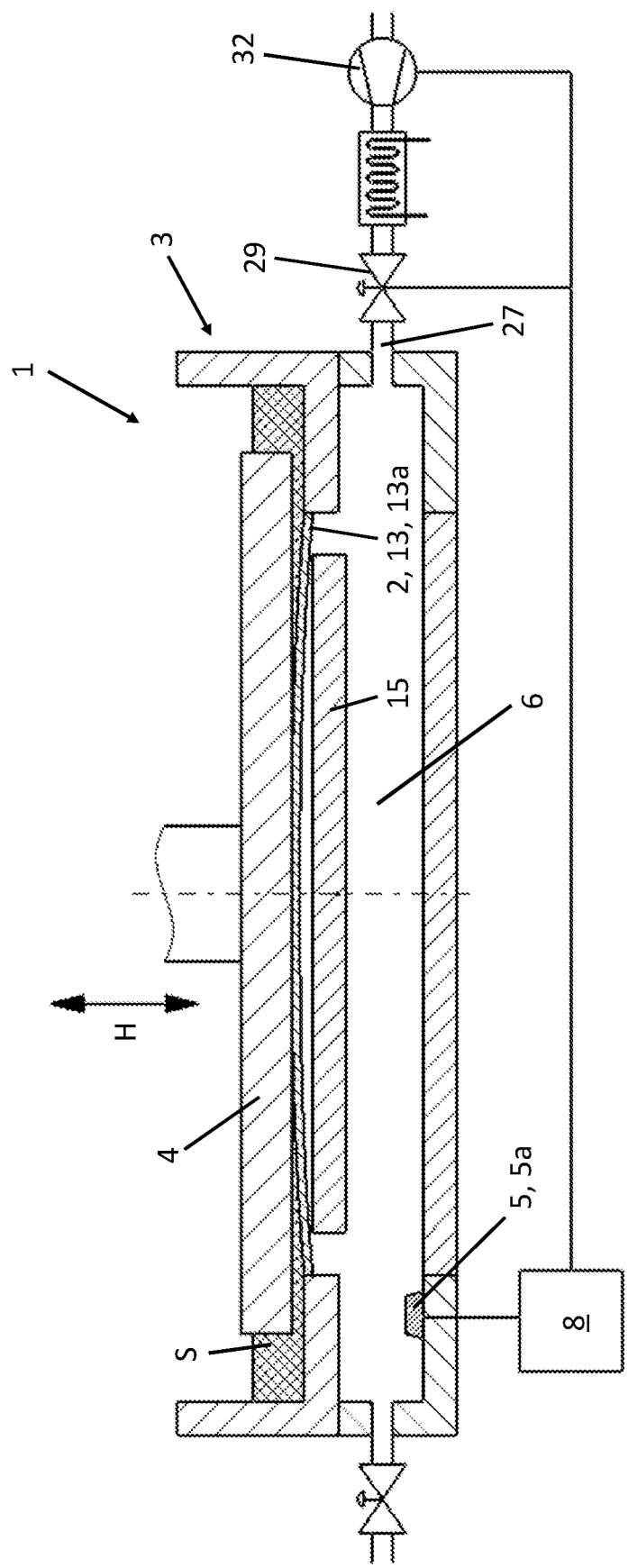
FIG. 16 shows the device from FIG. 2 with an excess pressure in the chamber which deflects the vat base towards the building platform.

FIG. 16 shows the device 1 in a state in which before the building platform 4 or the last-hardened layer Kn of the body K touches the vat base 2, an excess pressure deflecting the vat base 2 towards the building platform 4 was established in the chamber 6 by the processing unit 8. In the example shown in FIG. 16, the building platform 4 was already moved a short distance downwards in the negative Z direction to touch the vat base 2. The setting of the excess pressure in the chamber 6 is made depending on the pressure detected by the sensor 5, in particular pressure sensor 5*a*, in the chamber 6. For this purpose, the pressure sensor 5*a* is connected via the processing unit 8 to a compressor 32 connected to the chamber 6. The excess pressure brings about an upward curvature of the foil 13*a*. As a result, when using a carrier plate 15, a touching can also be used in order to detect by means of the pressure sensor 5*a* a touch time by means of a sudden increase in pressure. In order to produce the excess pressure in the chamber 6, this is configured to be closed or at least closable.

At the beginning of the production of a body K, the building platform 4 is lowered so far that it is located in the region of a layer thickness (preferably 10 μm-300 μm) above the vat base 2. The subsequent exposure of the first layer K1 of the body K to be produced is usually carried out with increased energy input in order to ensure a secure adhesion of the layer K1 to the building platform 4. Due to, for example, the accuracy of the height positioning of the building platform 4, the ageing of the vat and due to differences in the vat production, the distance between the building platform 4 and the vat base 2 can vary so that the adhesion of the first layer K1 cannot always be guaranteed. An active touching of the vat base by the building platform 4 shown in FIG. 16 is therefore appropriate and prevents the problems listed above. For this purpose, the pressure in the chamber 6 is increased by means of the compressor 32 or a pressure source 18 (see FIG. 6*a*) so that a slight convex curvature of the vat base 2, as in FIG. 16, is produced. The building platform 4 then moves in the direction of the vat base 2, i.e. downwards. As soon as the building platform 4 touches the curved vat base 2, the pressure in the chamber 6 increases further. The building platform 4 can be moved further in the direction of the vat base 2 until the pressure no longer varies, then the vat base 2 rests on the carrier plate 15 and is pressed flat. A further movement in the negative Z direction results, for example, in a step loss in the step motor or in damage to the vat 3.

Figure 17:
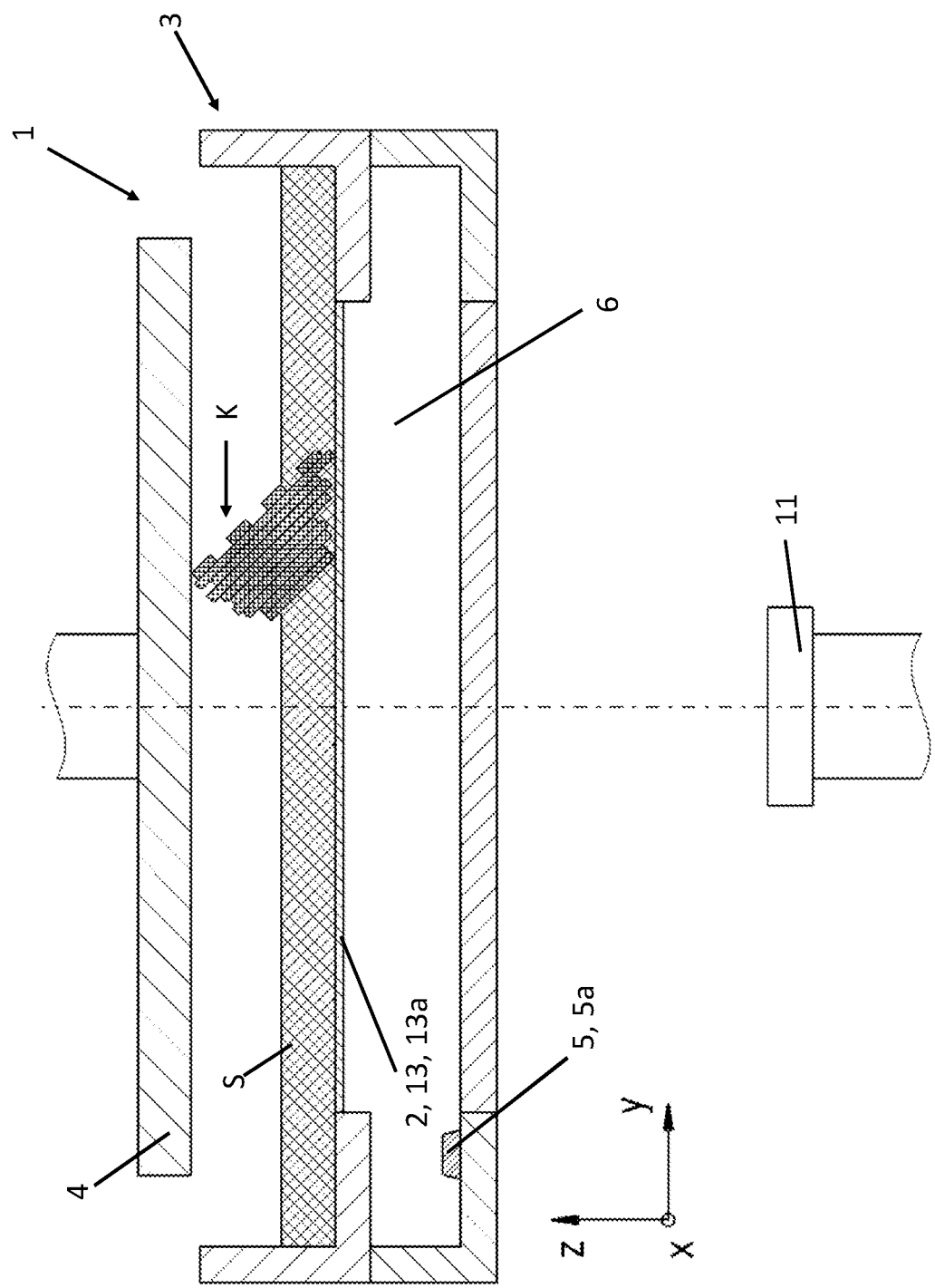
FIG. 17 shows the device from FIG. 1 with a body incorrectly released partially from the building platform.

FIG. 17 shows an error case in which a body K has undesirably become partially released from the building platform 4. Such an error case can be detected with the sensor 5 (pressure sensor 5a or flow sensor 5b) since a further movement of the building platform 4 downwards in the negative Z direction results in a premature reduction in volume (pressure increase or reduction in the amount of substance) in the chamber 6. The prematureness of the volume reduction can be determined and identified from the predicted height of the body K on the basis of the layers K1-Kn already produced and the path of the building platform 4 notified by the step motor compared to the time of the volume reduction detected by the sensor 5.

Figure 18A:
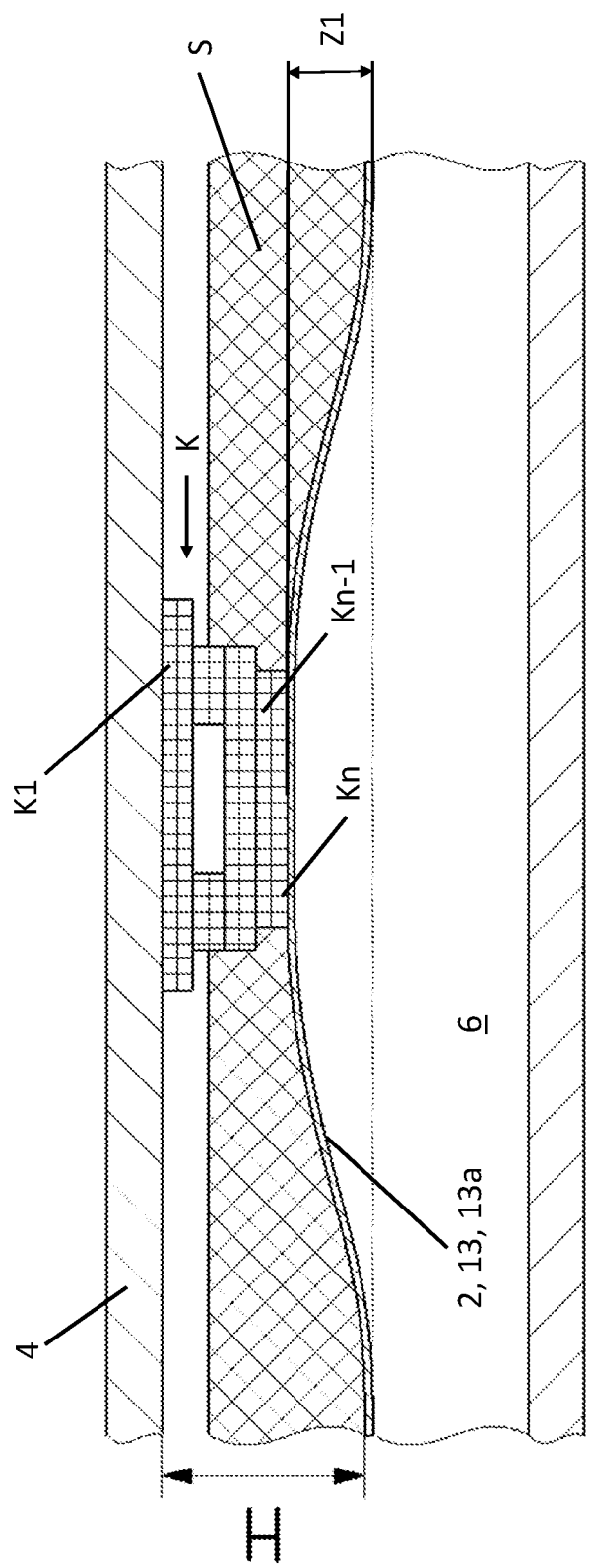
FIGS. 18a to 18c shows a release process of the last-hardened layer of the body from the vat base in three exemplary states.
Figure 18B:
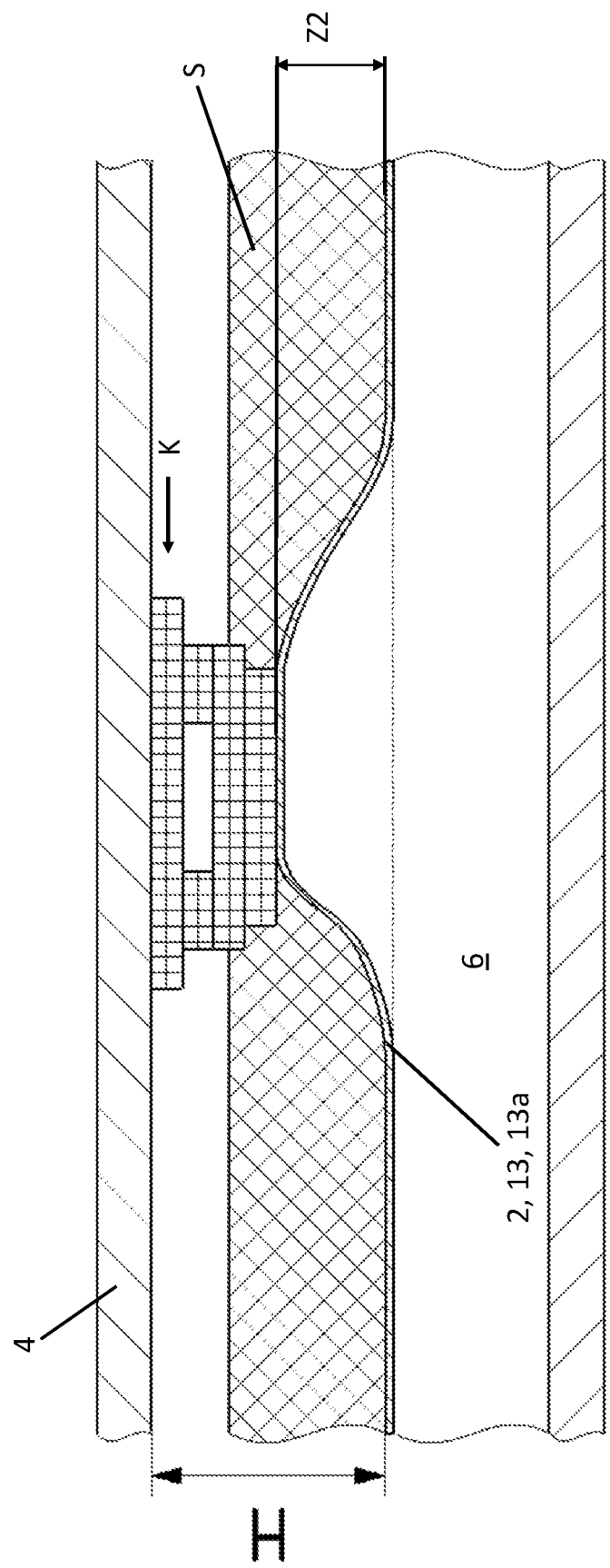
Figure 18C:
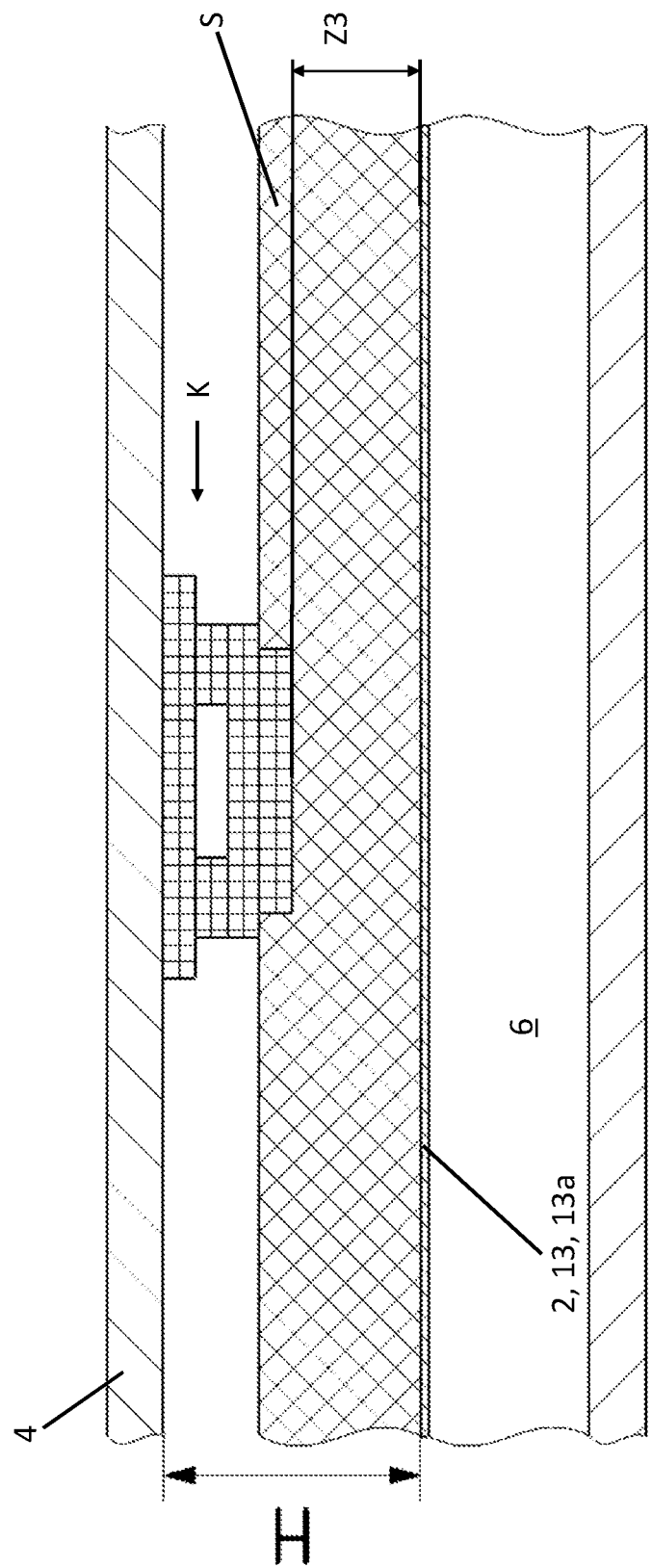

FIGS. 18a to 18c show how the curved vat base 2 is released from the last-hardened layer Kn of the body K wherein the height of the building platform 4 is varied (Z1<Z2<Z3). In FIG. 18a the building platform 4 has already been move a short distance in the positive z direction. In FIG. 18b the building platform 4 has been moved further in the positive z direction and a partial separation has already taken place. In FIG. 18c the building platform 4 has been moved a little further in the positive z direction and the vat base 2 has been completely released from the body K at this time point and returned into its rest position. As a result, the volume of the chamber 6 has reduced which corresponds to a negative sign ("−") of the volume change.

Figure 19:
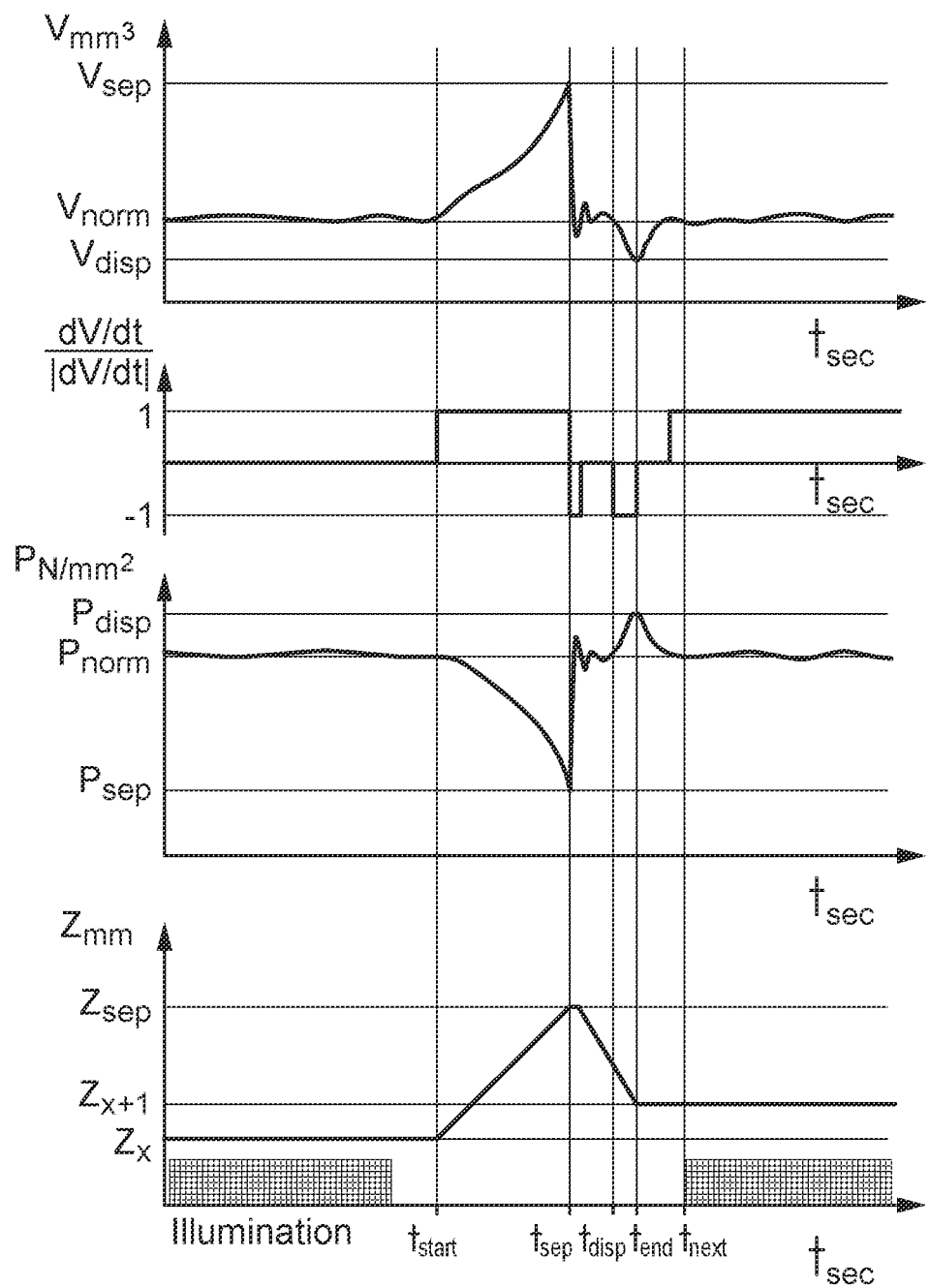
FIG. 19 shows diagrams with exemplary behaviours (courses) of the volume of the chamber, the pressure in the chamber and the height of the building platform above the vat base for the release process shown in FIGS. 18a to 18c in the case of a substantially closed chamber.

FIG. 19 shows time profiles of the volume of the chamber 6, of the sign of the volume change of the volume, of the pressure change in the chamber 6 resulting from the volume change, when the chamber 6 is closed, and of the z position or height of the building platform 4 in relation to the rest position of the vat base 2 during a layer generation monitored by the sensor 5, in particular pressure sensor 5a. Initially, the hardenable, for example, light-hardening substance S is hardened with a desired cross-sectional shape to form a layer Kn. Then the hardened layer Kn, which has formed between the vat base 2 and the previously generated layer Kn−1 must be separated from the vat base 2. From $t_{start}$, the building platform 4 is moved from $z_x$ in the positive Z direction. As a result of the flexible design of the vat base 2, this is deformed concavely in the Z direction and the volume in the chamber 6 increases from the normal volume $V_{norm}$ (cf. FIG. 18a shortly thereafter). The positive volume change (sign "+" or "1") results in a proportional pressure reduction starting from $p_{norm}$, this is detected by the pressure sensor 5a. Depending on cross-sectional shape, layer thickness, material and many other factors, the generated layer Kn separates from the vat base 2 as soon as the height $z_{sep}$ (at the time $t_{sep}$) has been reached (cf. FIG. 18c). The curved vat base 2 moves abruptly back into its planar original shape (rest position). Depending on the design and material of the vat base 2, a damped vibration can occur. The transition of the vat base 2 into the rest position results in a rapid negative volume change (sign "−" or "−1") which results in $V_{norm}$ and therefore in a measurable pressure change from $p_{sep}$ to $p_{norm}$. The release time or separation time $t_{sep}$ can thus, for example, be identified by means of the sign change of the volume change from "1" to "−1" during the separation process (the sign of the volume change can optionally be determined as the reverse sign of the pressure change). As a result, the separation process, i.e. the raising of the building platform 4 can be ended and the building platform moved from $z_{sep}$ to $z_{x+1}$ (lowered). At $t_{disp}$ a displacement of material occurs which concavely curves the vat base 2 and reduces the volume of the chamber 6 so that the measured pressure increases. At the time tend the Z position $z_{x+1}$ at which the new layer should be generated is reached. The pressure in the chamber $p_{disp}$ is greater than $p_{norm}$. Thus, the irradiation, for example exposure is only initiated at time $t_{next}$. This ensures that the material displacement which is characterized by a planar vat base 2 and a resulting chamber pressure $p_{norm}$ is completed. The exposure time is shown by chequered rectangles in the diagram of the Z position. Knowledge of the separation time $t_{sep}$ is very valuable in terms of process technology since without this a prospective separation height $z_{sep}$ must be assumed and this must be exposed with sufficient certainty (margin) in order to achieve a separation in each case. This has the result that the building platform 4 (without knowledge of the separation time $t_{sep}$) is frequently moved further in the positive Z direction although the layer Kn has already been released from the vat base 2. In this case, several seconds per layer are moved to no avail. Usual bodies to be generated consist of more than 1000 layers so that the print job is increased appreciably without knowledge of the separation time $t_{sep}$.

Figure 20B:
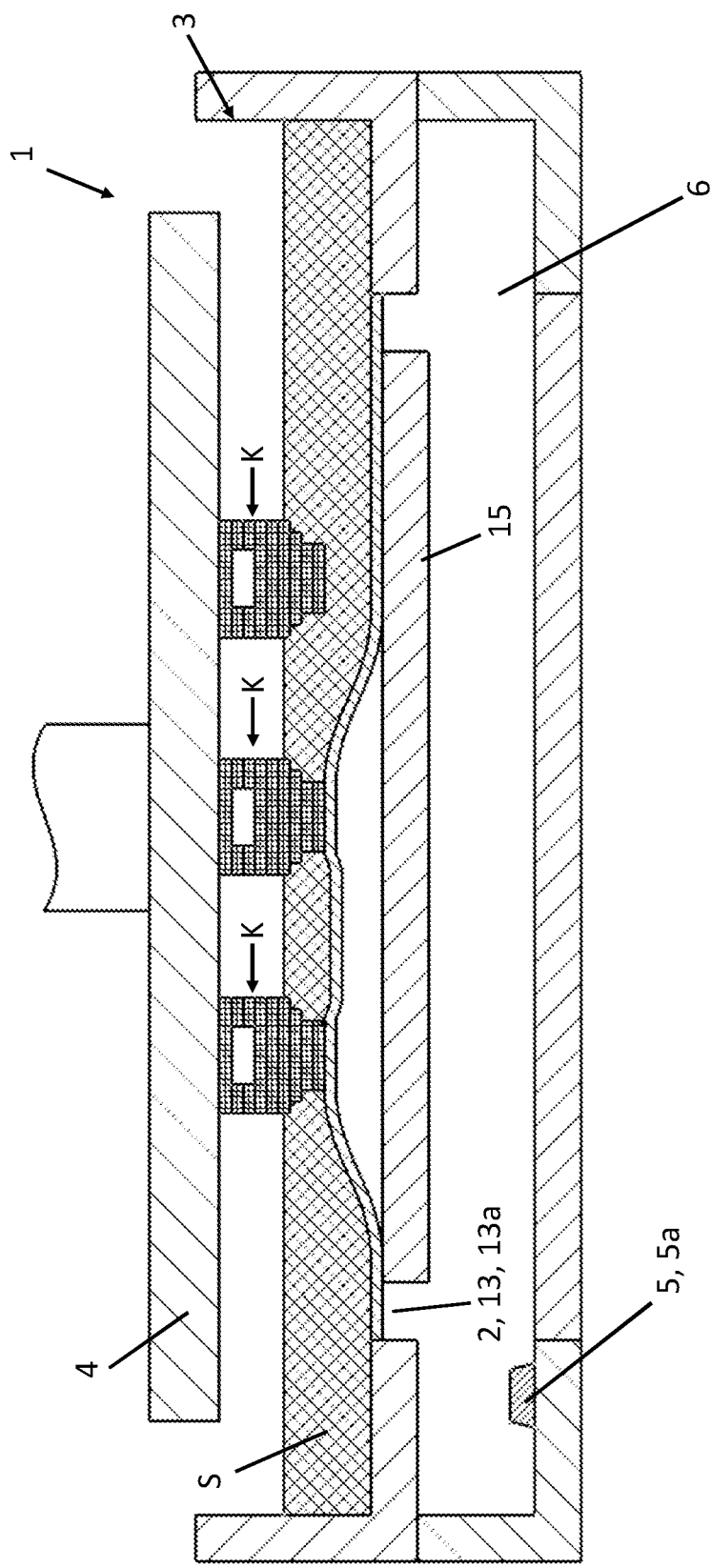

FIGS. 20a and 20b show a process of separation of three bodies K from the vat base 2, wherein in FIG. 20b the body K shown furthest right has already been separated from the vat base 2 and in the region underneath the body K shown furthest right the vat base 2 has returned into its rest position. By means of the volume change (pressure change or change in amount of substance) detected by the sensor 5 (pressure sensor 5a or flow sensor 5b) in the chamber 6, it can be ascertained whether individual bodies K have not yet been released.

Figure 21:
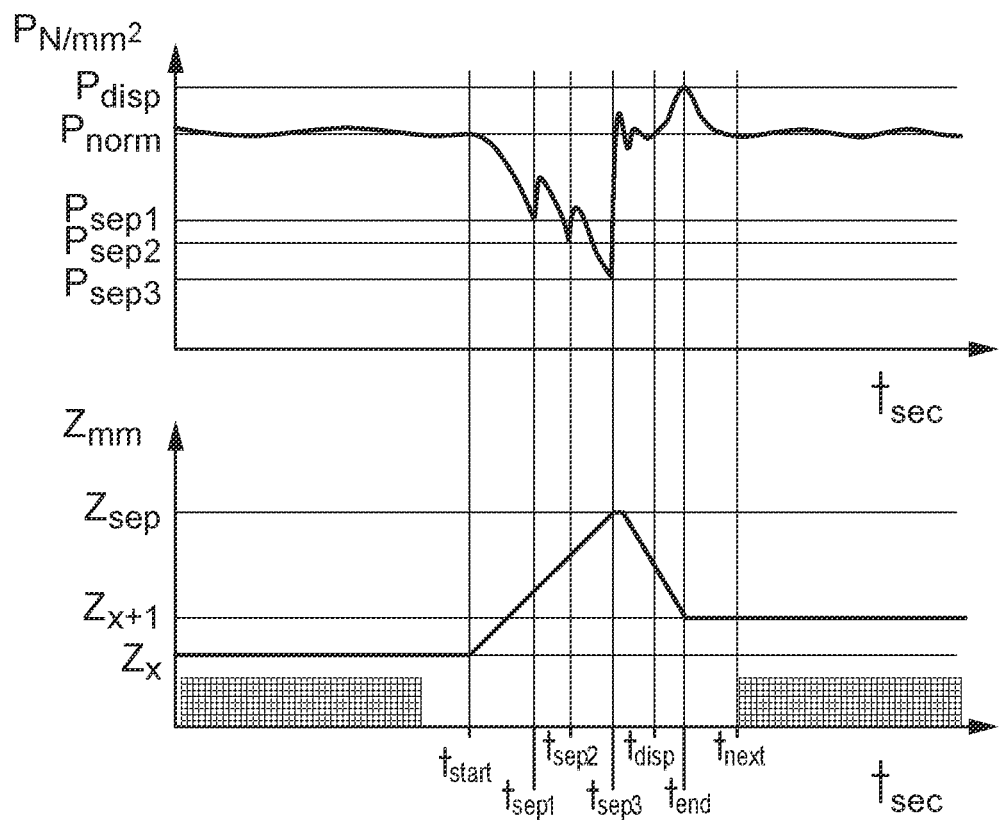
FIG. 21 shows diagrams with exemplary behaviours (courses) of the pressure in a substantially closed chamber and the height of the building platform above the vat base for the release process shown in FIGS. 20a and 20b.

FIG. 21 shows time profiles of the pressure change and of the Z position or height of the building platform 4 in relation to the rest position of the vat base 2 during a layer generation monitored by the sensor 5, in particular pressure sensor 5a. In this case, at time $t_{sep1}$ the body K shown furthest right is released from the vat base 2, at time $t_{sep2}$ the body K shown in the middle is released from the vat base 2 and at time $t_{sep3}$ the body K shown furthest left is released from the vat base 2. The three local minima in the time profile of the pressure change are the release pressures $p_{sep1}$, $p_{sep2}$ $p_{sep3}$ of the three generated bodies K. The exposure time is shown in the diagram of the Z position by chequered rectangles.

Figure 22:
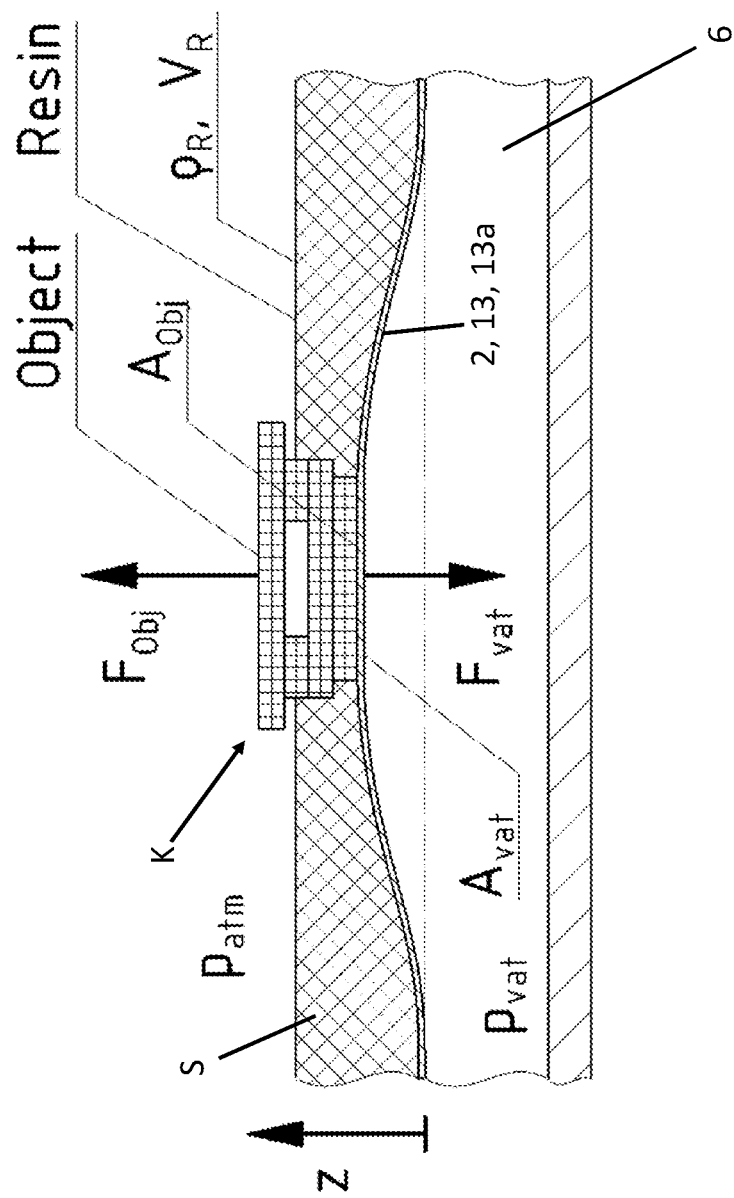
FIG. 22 shows a body adhering to the vat base.

FIG. 22 shows a static force model of the separation process for a possible calculation of the desired volume change with which the actual volume changes can be compared. As a result, the generated bodies K can be assigned to the individual separation times.

Allowance is made for the pulling force $F_{obj}$, the restoring force of the deflected vat base 2 $F_{vat}$, the weight force of the poured-in resin as hardenable substance S $\rho_R V_R g$, as well as the forces produced by the pressure difference in the machine space $(A_{vat}-A_{Obj})p_{atm}$ and in the vat chamber 6 $A_{vat}p_{vat}$:

It holds that:

$$\sum_i F_{z,i} = 0 = F_{obj} - F_{vat} - \rho_R V_R g - (A_{vat} - A_{Obj})p_{atm} + A_{vat}p_{vat}$$

$$F_{Obj} - F_{vat} = \rho_R V_R g + (A_{vat} - A_{Obj})p_{atm} - A_{vat}p_{vat}$$

The known forces are on the right-hand side of the equation through knowledge of the material properties and the fill level as well as by measurement of the pressure.

Machine space can be understood as a general space in the machine, this can also be the installation space.

Since the shape and position of $A_{obj}$ is known, $F_{vat}$ can be approximately calculated/predicted with the aid of the Z height and the material properties of the foil 13a. The pulling force $F_{obj}$ can be concluded as a result. This influences the object quality and can result in undesired release from the building platform 4. In a control circuit it can also serve as a reference variable with the pulling speed as control variable.

Furthermore, the foil curvature due to the deflection can be calculated as a result of the known parameters. The resulting desired volume change can be compared by means of the sensor data with an actual volume change which is obtained as follows:

The change of state of the chamber is obtained from:

$$\frac{p_1 * V_1}{T_1} = \frac{p_2 * V_2}{T_2}$$

Wherein it holds for the volume that $V_2 = V_1 + \Delta V_{ist}$, as a result the actual volume change can be calculated $$\Delta V_{ist} = V_1 * \left(\frac{p_1}{p_2} * \frac{T_2}{T_1} - 1\right)$$

An excessive deviation between desired and actual volume ($\Delta V_{ist} < \Delta V_{soll}$) indicates a reduction in the stiffness of the vat whereby the ageing of the vat or the quality of the vat 3 can be assessed.

The device and the method thus make it possible to model the desired deformation of the flexible vat base 2 with the aid of the known position of the building platform 4 and the known hardening positions, e.g. in the form of an exposure matrix and to compare the resulting desired pressure change (desired volume change) with the actual pressure change (volume change). Deviations indicate inter alia a change in the stiffness of the vat whereby the ageing of the vat or the quality of the vat 3 can be assessed.

Figure 23A:
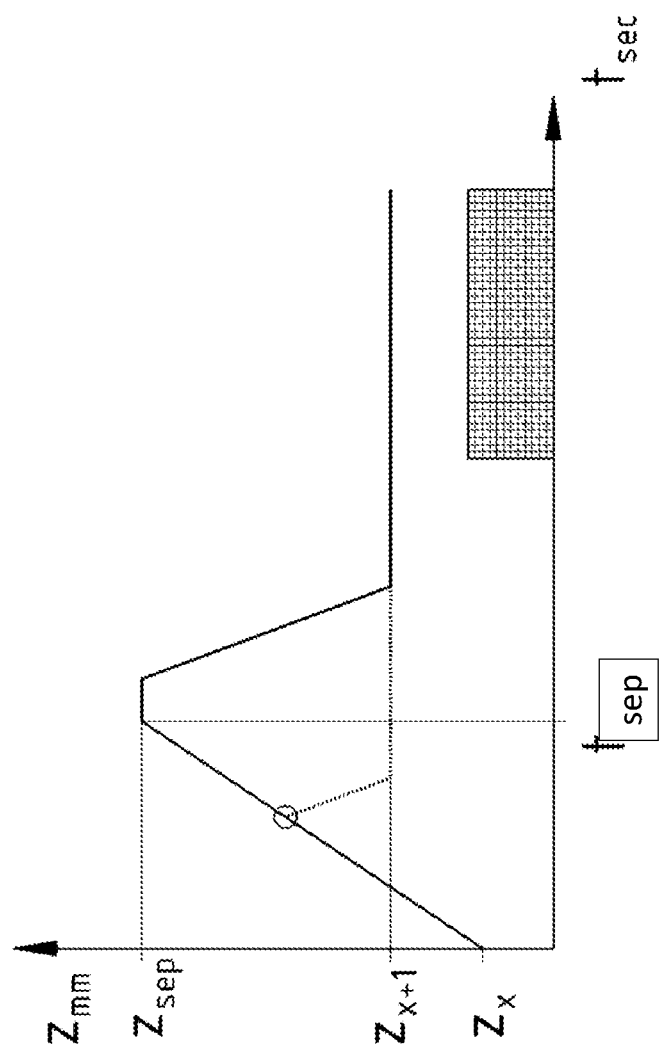
FIGS. 23a to 23c show diagrams with exemplary behaviours (courses) of the height of the building platform above the vat base and with the exposure time.
Figure 23B:
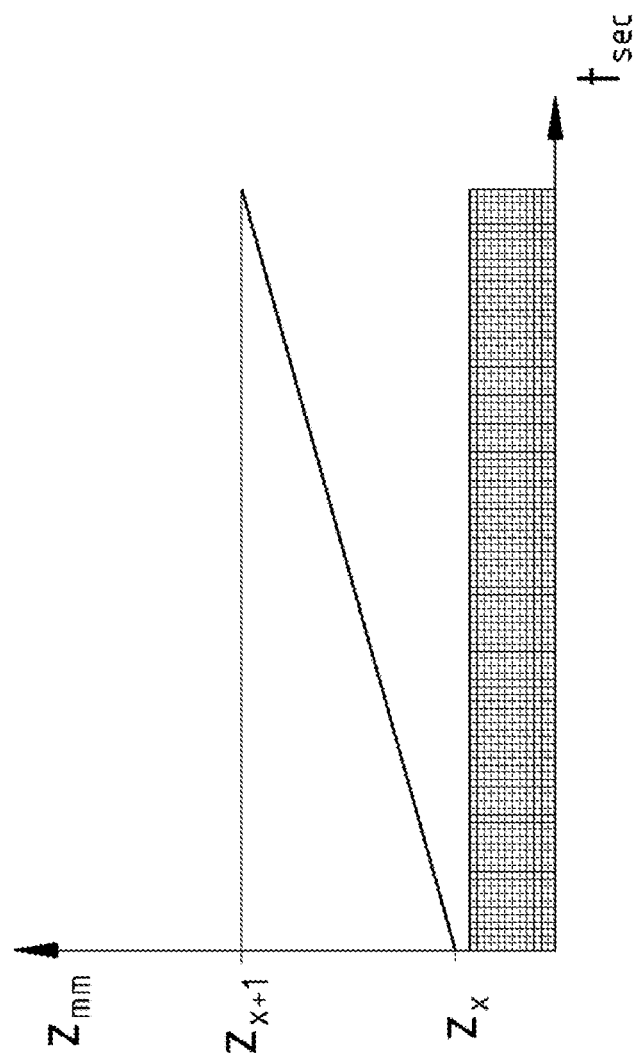
Figure 23C:
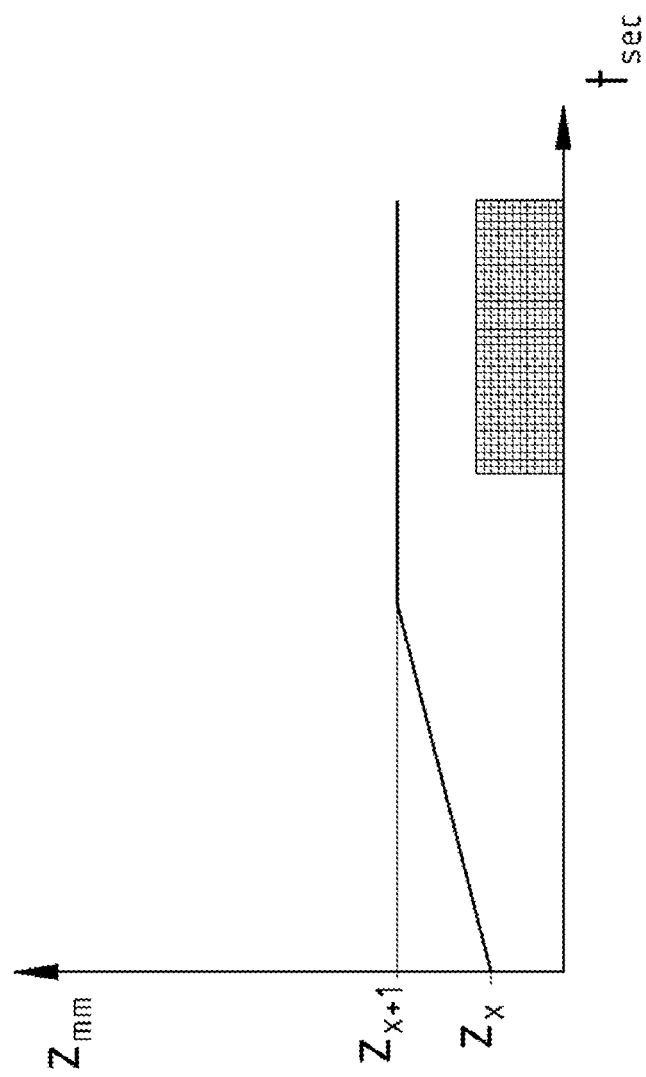

FIGS. 23a to 23c show relationships of the height adjustment of the building platform 4 with the exposure time of the hardenable substance S for three process sequences. The exposure time is shown by chequered rectangles in the diagrams.

FIG. 23a shows in particular a process in which the exposure of the hardenable substance S is carried without using an inhibiting layer I separate from the movement of the building platform 4 (asynchronous mode without inhibiting layer I). In this case, the building platform 4 moves upwards in the positive Z direction to separate the generated layer from the vat base 2. As a result of the measured values of the sensor 5 (pressure sensor 5a or flow sensor 5b), the separation of the generated layer from the vat base 2 is identified and the raising of the building platform 4 is ended. The building platform 4 is lowered again and after a displacement waiting time the next layer is exposed. The measured values of the sensor 5 (pressure sensor 5a or flow sensor 5b) are used in the asynchronous process with vat 3 without inhibiting layer I to identify the release time and to set the pulling speed by maximum permissible volume change per time unit.

FIG. 23b shows in particular a process in which the exposure of the hardenable substance S and the movement of the building platform 4 upwards by the height of a layer thickness take place simultaneously (synchronous mode with inhibiting layer I). The pressure sensor 5a and the flow sensor 5b can be used here to monitor the fill level of the vat 2 and/or the depletion of the inhibiting layer and thus enable a suitable control of the pressure in the chamber 6, a supply of inhibitor medium into the chamber 6 and an adaption of the temperature in the chamber 6.

FIG. 23c shows in particular a process in which the exposure of the hardenable substance S takes place after the movement of the building platform 4 upwards by the height of a layer thickness using an inhibiting layer I (asynchronous mode with inhibiting layer I).

Figure 24:
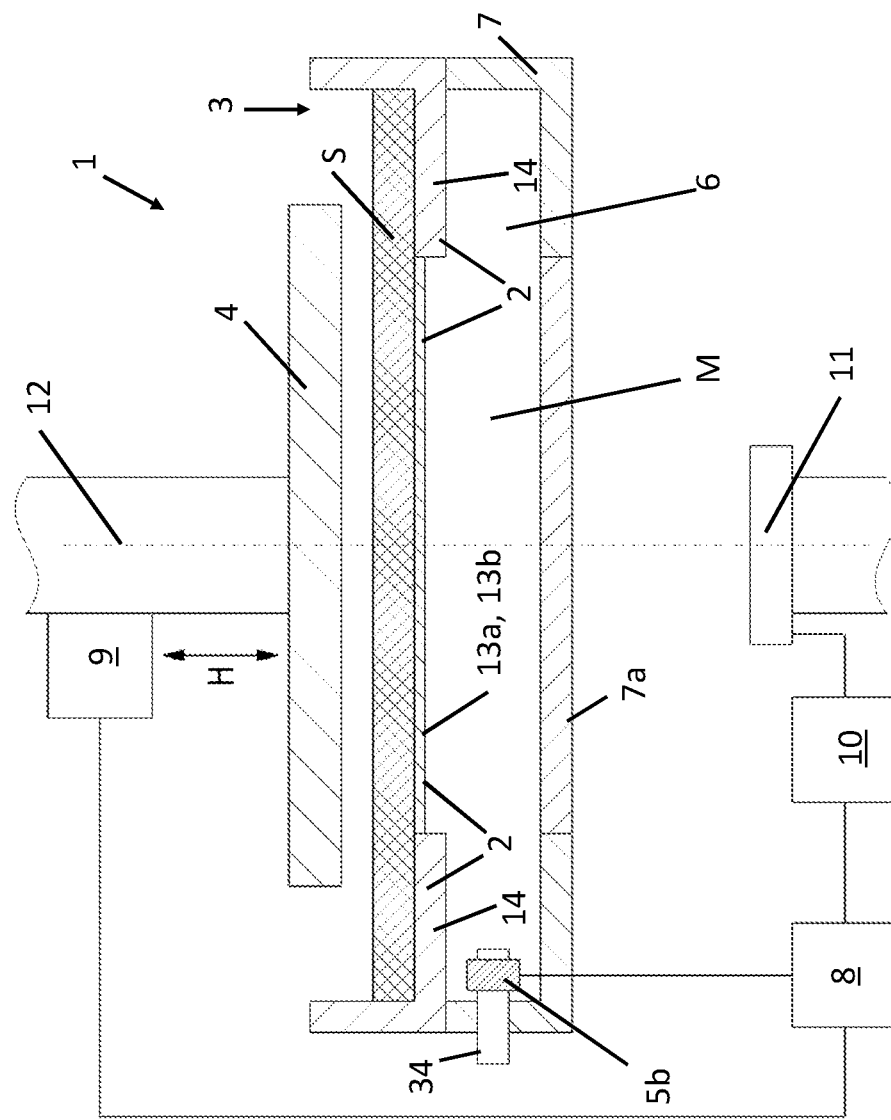
FIG. 24 shows a device according to the invention with a flow sensor instead of a pressure sensor.

FIG. 24 shows a device 1 according to the invention similar to the device 1 from FIG. 1 wherein unlike the device 1 from FIG. 1 instead of the pressure sensor 5a which cooperates with a closed chamber 6, a flow sensor 5b is provided which cooperates with a partially open chamber 6. The partially open chamber 6 comprises an opening 34 serving as an inlet and an outlet for fluid. Thus, in the case of a volume change of the chamber 6, the fluid enclosed or contained in the chamber 6 can flow in or flow out through the opening 34. This fluid flow through the opening 34 is detected by the flow sensor 5b. The person skilled in the art will understand that in some exemplary embodiments shown in the figures, in particular depending on the process steps carried out by the device 1, the closed chamber 6 with the pressure sensor 5a can be replaced by a partially open chamber 6 with the flow sensor 5b.

The invention claimed is:

1. Device for a system for layer-by-layer construction of a body (K) from a substance (S) which can be hardened by radiation, comprising:
    a vat having a vat base being configured to be at least partially flexible, wherein the vat is configured for receiving the substance (S) which can be hardened by radiation,
    a building platform which is arranged above the vat base and which is height-adjustable in relation to the vat base, and
    a sensor cooperating with the vat base, and
    a chamber that is delimited by an underside of the vat base,
    wherein the sensor is adapted to detect a volume change of the chamber and to provide a sensor signal from which a sign of the volume change can be determined,
    wherein the sensor is adapted to quantitatively detect a measured variable directly or indirectly proportional to the volume of the chamber or to the volume change and to provide the measured variable as a sensor signal,
    wherein the sensor is a pressure sensor or a flow sensor such that the pressure sensor is adapted to detect a pressure and/or a pressure change of a compressible medium (M) received in the chamber, wherein the pressure change corresponds to the volume change, and such that the flow sensor is adapted and arranged to detect a change in an amount of the substance enclosed in the chamber of a fluid received in the chamber, wherein the change in the amount of the substance corresponds to the volume change, wherein the sensor is adapted to provide a detected pressure and/or a detected pressure change and/or a detected change in the amount of substance as a measured variable and sensor signal.

2. Device according to one of claim 1, wherein the sensor is connected to a processing unit which is adapted to process the sensor signal provided by the sensor.

3. Device according to claim 2, wherein the sensor is connected, via the processing unit to (i) a first drive unit for adjusting the height of the building platform and/or (ii) to a control unit for irradiation by a radiation source of the substance (S) which can be hardened by radiation, and wherein the processing unit is adapted to control (i) the a first drive unit for the height-adjustable building platform and/or (ii) the control unit for the radiation source depending on the sensor signal provided by the sensor.

4. Device according to claim 1, wherein the chamber is connected to at least one adjustable pressure source for setting a resting pressure in the chamber and/or an adjustable heating device for setting a temperature in the chamber and/or an adjustable process substance source for the adjustable supply of a process medium (Mi) for the at least local manipulation of the solidification process of the substance (S) which can be hardened by radiation into the chamber and/or an air flow source for producing an air flow in the chamber.

5. Device according to claim 2, wherein the sensor is connected via the processing unit to (i) the adjustable pressure source and/or (ii) the adjustable heating device and/or (iii) the adjustable process substance source and/or (iv) the air flow source, and wherein the processing unit is adapted to control (i) the pressure source and/or (ii) the heating device and/or (ii) the process substance source and/or (iv) the air flow source depending on the sensor signal provided by the sensor.

6. Device according to claim 1, wherein the vat base is at least partially permeable to radiation and includes a flexible, tensioned foil.

7. Device according to claim 1, wherein the vat base is configured to be semi-permeable, permeable for a process medium (Mi).

8. Device according to claim 1, wherein at least a part of the vat base rests on a carrier plate which is at least partially permeable to radiation.

9. Device according to claim 8, wherein the carrier plate is configured to be permeable for a process medium (Mp) or comprises elevations resting on the vat base for passage of a process medium (Mp) between the elevations.

10. Device according to claim 1, further comprising a doctor blade which is movable in the vat on the vat base.

11. Device according to claim 10, wherein the sensor is connected to a second drive unit of the doctor blade via a processing unit and the processing unit is adapted to control the second drive unit of the doctor blade depending on the sensor signal provided by the sensor.

12. Device according to claim 1, wherein the vat base is an openable cover of a chamber housing of the chamber.

13. Method for the layer-by-layer construction of a body (K) from a substance (S) which can be hardened by radiation and which is received in a vat having a vat base, in which each layer (K1, ... Kn) of the body (K) to be formed from a building platform which is height adjustable in relation to the vat base, the method comprising the steps of:
moving the building platform into a height above the vat base wherein the height defines a distance between the building platform or the last-formed layer (Kn) of the body (K) to the vat base
selectively hardening the substance (S) by means of a radiation source to form the layer (Kn+1) of the body (K)
moving the building platform away from a rest position of the vat base to create space for the formation of a next layer (Kn+2) between the hardened layer (Kn+1) of the body (K) and the vat base, wherein the vat base is configured to be at least partially flexible;
detecting at least one process parameter by a sensor cooperating with the vat base,
detecting by the sensor a volume change of a chamber and providing a sensor signal from which a sign of the volume change is determined,
wherein the chamber is delimited by an underside of the vat base, and
wherein the volume of the chamber is varied by process-dependent deflections of the vat base from the rest position,
wherein the sensor quantitatively detects a measured variable directly or indirectly proportional to the volume of the chamber or to the volume change and provides the measured variable as a sensor signal, and
wherein the sensor is a pressure sensor or a flow sensor, wherein the pressure sensor detects a change in the pressure of a compressible medium (M) in the chamber as a measured variable, such that the change in the pressure corresponds to the volume change, or wherein the flow sensor detects a change in the amount of substance of the amount of substance of a fluid enclosed in the chamber as a measured variable, such that the change in the amount of substance corresponds to the volume change.

14. Method according to claim 13, wherein the sensor signal provided by the sensor is processed in a processing unit connected to the sensor and at least one process parameter is set depending on the sensor signal provided by the sensor.

15. Method according to claim 14, wherein the processing unit compares the detected measured variable provided as the sensor signal with a predicted value and/or compares the behaviour of detected measured variables with a behaviour of a plurality of predicted values and sets the at least one process parameter depending on the difference between the measured variable and the predicted value and/or between the behaviour of the measured variables and the behaviour of the plurality of predicted values.

16. Method according to claim 15, wherein changes in the measured variable detected by the sensor and provided as the sensor signal are processed in a processing unit connected to the sensor in a simulation model of the plurality of predicted values of the construction process and at least one process parameter is set depending on at least one detected measured value of the measured variable and/or on the change in detected measured values as specified by the simulation model.

17. Method according to claim 14, wherein the predicted value and/or the plurality of predicted values is or are calculated depending on at least one process parameter by the processing unit.

18. Method according to claim 16, wherein the simulation model takes into account at least one set process parameter as an input value.

19. Method according to claim 14, wherein based on the sensor signal provided by the sensor, determining the height of the building platform and/or of the last-hardened layer (Kn) of the body (K) in relation to the rest position of the vat base and/or a motion speed of the building platform (4) and/or the size of an area of the last-hardened layer (Kn) of the body (K) as a process parameter in the processing unit when the vat base is deflected from the rest position by movements of the building platform.

20. Method according to claim 14, wherein depending on the sensor signal provided by the sensor, controlling as one or more process parameters (i) a height adjustment of the building platform by means of a first drive unit for the building platform, in which the first drive unit is connected to the building platform and to the processing unit, and/or (ii) an irradiation of the substance (S) which can be hardened by radiation by the processing unit by means of a control unit for the radiation source, in which the control unit is connected to the processing unit and the radiation source.

21. Method according to claim 14, wherein depending on the sensor signal provided by the sensor, setting as one or more processing parameters by the processing unit (i) a resting pressure in the chamber by means of at least one adjustable pressure source that is connected to the chamber and the processing unit and/or (ii) a temperature in the chamber is set by means of at least one adjustable heating device that is connected to the chamber and the processing unit and/or (iii) a supply of a process medium (Mp) into the chamber is set by means of at least one adjustable process substance source that is connected to the chamber and the processing unit and/or (iv) an air flow in the chamber is set by means of at least one air flow source that is connected to the chamber and the processing unit.

22. Method according to claim 14, further comprising the step of determining at least one process parameter in the processing unit from the sensor signal provided by the sensor wherein in the at least one process parameter is selected from the group consisting of (i) a release of a last-hardened layer (Kn) of the body (K), which layer (Kn) adheres to the vat base, from the vat base; (ii) a release height, (iii) a release speed of a last-hardened layer (Kn) of the body (K), which layer (Kn) adheres to the vat base, from the vat base; (iv) a touching of the vat base; (v) a contact pressure of a doctor blade which is movable in the vat, on the vat base; (vi) a body (K) incorrectly released from the building platform; (vii) a vat ageing; (viii) an unexpected adhesion of the body (K) on the vat base when supplying an inhibitor medium (Mi) into the chamber and onto the substance (S) which can be hardened by radiation; (ix) a fill level of the substance (S) which can be hardened by radiation in the vat; (x) a provision of the vat and/or (xi) a crack or hole in the vat base or in the chamber.

23. Method according to claim 14, wherein depending on the sensor signal provided by the sensor, setting a negative pressure deflecting the vat base away from the building platform in the chamber by the processing unit for the release of a last-hardened layer (Kn) of the body (K), which layer adheres to the vat base, during movement of the height-adjustable building platform away from the resting position of the vat base.

24. Method according to claim 14, wherein depending on the sensor signal provided by the sensor, setting an excess pressure to deflect at least a portion of the vat base towards the building platform in the chamber by the processing unit before a touching of the building platform (4) or of the last-hardened layer (Kn) of the body (K) on the vat base.

25. Method according to claim 14, further comprising the steps of:
moving the height-adjustable building platform with a last-hardened layer (Kn) of the body (K), which layer adheres to the building platform and to the vat base, away from a rest position of the vat base,
determining a release of the last-hardened layer (Kn) of the body (K), which layer adheres to the vat base, from the vat base in the processing unit by means of the sensor,
moving the height-adjustable building platform into a height (Zx+1) above the rest position of the vat base which height defines a distance between the last-hardened layer (Kn) of the body (K) to the rest position of the vat base in the extent of at least the thickness of the layer (Kn+1) of the body (K), which layer is to be newly formed, and
selectively hardening the substance (S by means of the radiation source by irradiation to form the new layer (Kn+1) of the body (K).

26. Method according to claim 14, wherein an inhibitor medium (Mi) is supplied via the chamber to the substance (S) which can be hardened by radiation and the height-adjustable building platform with a last-hardened layer (Kn) of the body (K), which layer adheres to the building platform, is moved into a height (Zx+1) above the rest position of the vat base which height defines a distance between the last-hardened layer (Kn) of the body (K) to the rest position of the vat base in the extent of at least the thickness of the layer (Kn+1) of the body (K), which layer is to be newly formed, whilst at the same time as the movement of the height-adjustable building platform the substance (S) which can be hardened by radiation is hardened selectively by means of the radiation source by irradiation to form the new layer (Kn+1) of the body (K).

27. Method according to claim 14, wherein an inhibitor medium (Mi) is supplied via the chamber to the substance (S) which can be hardened by radiation and the height-adjustable building platform with a last-hardened layer (Kn) of the body (K), which layer adheres to the building platform, is moved into a height (Zx+1) above the rest position of the vat base which height defines a distance between the last-hardened layer (Kn) of the body (K) to the rest position of the vat base in the extent of at least the thickness of the layer (Kn+1) of the body (K), which layer is to be newly formed, and then the substance (S) which can be hardened by radiation is hardened selectively by means of the radiation source by irradiation to form the new layer (Kn+1) of the body (K).

\* \* \* \* \*